US009458289B2

(12) United States Patent
Shozui et al.

(10) Patent No.: US 9,458,289 B2
(45) Date of Patent: *Oct. 4, 2016

(54) POLYESTER COMPOUND

(71) Applicant: Ajinomoto Co., Inc., Toyko (JP)

(72) Inventors: Fumi Shozui, Kawasaki (JP); Ryotaro Nakaya, Kawasaki (JP); Takashi Ineyama, Kawasaki (JP); Keiichi Yokoyama, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,727

(22) Filed: Oct. 1, 2015

(65) Prior Publication Data

US 2016/0024248 A1    Jan. 28, 2016

Related U.S. Application Data

(63) Continuation of application No. PCT/JP2014/059678, filed on Apr. 1, 2014.

(30) Foreign Application Priority Data

Apr. 5, 2013 (JP) ................................. 2013-079995

(51) Int. Cl.
*C08G 63/02* (2006.01)
*C08G 63/685* (2006.01)
*C08G 63/78* (2006.01)

(52) U.S. Cl.
CPC ........... *C08G 63/6856* (2013.01); *C08G 63/78* (2013.01)

(58) Field of Classification Search
CPC .......................... C08G 63/605; C08G 63/672
USPC .......................................... 528/190.193, 194
See application file for complete search history.

(56) References Cited

U.S. PATENT DOCUMENTS 5,274,072 A * 12/1993 Weaver ................ C07D 413/04
528/354
5,830,981 A    11/1998 Koreishi et al.

FOREIGN PATENT DOCUMENTS

JP    8-283394 A    10/1996
JP    2006-282814 A    10/2006
JP    2010-254805 A    11/2010

OTHER PUBLICATIONS

Hans R. Kricheldorf et al. Thermotropic Polyesters based on 2-(4-carboxyphenyl)benzoxazole-5-carboxylic acid, Makromol, Chem. 193, pp. 2467-2476 (1992.*
Wutz et al. Layer Structures 8. Polybenzoxazole-esters; Macromolecules, 1997, vol. 30 lines 6127-6133.*
U.S. Appl. No. 14/872,671, filed Oct. 1, 2015, Shozui et al.
International Search Report issued May 13, 2014 in PCT/JP2014/059678.
Hans R. Kricheldorf, et al., "New polymer syntheses, 57. Thermotropic polyesters based on 2-(4-carboxyphenyl)benzoxazole-5-carboxylic acid" Makromol. Chem., vol. 193, 1992, pp. 2467-2476.
H. R. Kricheldorf, et al., "New Polymer Syntheses. 60. Thermostable Polymers of 2-(Hydroxyaryl)benzoxazole-5-Carboxylic Acids" Journal of Polymer Science: Part A: Polymer Chemistry, vol. 29, 1991, pp. 1751-1757.
Hans R. Kricheldorf, et al., "Whiskers. 4. Copolyesters of 4-Hydroxybenzoic Acid and 2-(4'-Hydroxyphenyl)benzoxazole-5-carboxylic Acid" Macromolecules, vol. 26, No. 24, 1993, pp. 6628-6632.
Angel Marcos-Fernandez, et al., "Novel aromatic polyamides with 1,3-benzoazole groups in the main chain. 1. Polymers derived from 2-(4-carboxyphenyl) benzoxazole-5- and 6-carboxylic acids. Synthesis and characterization" Polymer, vol. 42, 2001, pp. 7933-7941.
Combined Office Action and Search Report issued May 25, 2016 in Chinese Patent Application No. 201480019702.2 (with English translation of category of cited documents).

* cited by examiner

*Primary Examiner* — Terressa Boykin
(74) *Attorney, Agent, or Firm* — Oblon, McClelland, Maier & Neustadt, L.L.P

(57) ABSTRACT

Polyester compounds obtained by reaction of a compound represented by formula (1):

$$R^1-\underset{\underset{O}{\|}}{C}-\text{[benzoxazole]}-X^{Dc}+Y^{Dc}-X^{Dc}\underset{nDc}{\rceil}\underset{\underset{O}{\|}}{C}-R^1 \quad (1)$$

(defined herein) with a compound represented by formula (2):

$$R^4O-X+Y-Z\underset{n}{\rceil}-OR^4 \quad (2)$$

(defined herein) exhibit high thermal resistance.

18 Claims, No Drawings

POLYESTER COMPOUND

CROSS REFERENCES TO RELATED APPLICATIONS

This application is a continuation of International Patent Application No. PCT/JP2014/059678, filed on Apr. 1, 2014, and claims priority to Japanese Patent Application No. 2013-079995, filed on Apr. 5, 2013, both of which are incorporated herein by reference in their entireties.

BACKGROUND OF THE INVENTION

1. Field of the Invention

The present invention relates to a polyester compound. The present invention also relates to methods of preparing such a polyester compound.

2. Discussion of the Background

Polyester compounds such as polyethylene terephthalate (PET) and polybutylene terephthalate (PBT) are used in technical field such as packaging films, magnetic tapes, containers and clothing fibers, because they are flexible and have excellent gas barrier properties and chemical resistance. These polyester compounds are generally obtained by reaction of aromatic dicarboxylic acids such as terephthalic acid with aliphatic diols such as ethylene glycol (see, for example, JP-A-2010-254805 and JP-A-H8-283394, which are incorporated herein by reference in their entireties).

However, there remains a need for polyester compound with high thermal resistance.

SUMMARY OF THE INVENTION

Accordingly, it is one object of the present invention to provide novel polyester compound with high thermal resistance.

It is another object of the present invention to provide novel methods for preparing such a polyester compound.

These and other objects, which will become apparent during the following detailed description, have been achieved by the inventors' discovery that a polyester compound obtained by reaction of a dicarboxylic acid having a particular structure with a diol having a particular structure exhibits high thermal resistance, leading to completion of the present invention.

Specifically, the present invention includes the following embodiments:

(1) A polyester compound obtained by reaction of a compound represented by formula (1)

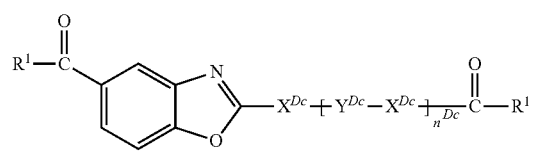

(1)

wherein $R^1$ represents a hydroxy group, a halogen atom, an alkoxy group, a cycloalkyloxy group, an aryloxy group, a group —OM, or a group —O—Si$(R^2)_3$, where M is a metal atom and $R^2$ is an alkyl group;

$X^{Dc}$ represents a divalent aromatic group optionally having a substituent;

$Y^{Dc}$ represents —O—, —N=N—, a carbonyl group, an alkenylene group optionally having a substituent, or a single bond;

$n^{Dc}$ represents an integer of 0 to 2;

the two $R^1$ may be the same as or different from each other;

when there are a plurality of $X^{Dc}$, they may be the same as or different from each other; and when there are a plurality of $Y^{Dc}$, they may be the same as or different from each other with a compound represented by formula (2):

(2)

wherein $R^4$ represents a hydrogen atom, an acyl group, or a group —Si$(R^5)_3$, where $R^5$ is an alkyl group;

X represents a divalent aliphatic hydrocarbon group optionally having a substituent;

Y represents an imino group optionally having a substituent, a divalent aromatic group optionally having a substituent, an oxyalkylene group optionally having a substituent, a group —S(=O)$_2$—, or an alkylene group optionally having a substituent;

Z represents a divalent aliphatic hydrocarbon group optionally having a substituent or a single bond;

n represents an integer of 0 to 5;

the two $R^4$ may be the same as or different from each other;

when there are a plurality of Y, they may be the same as or different from each other; and when there are a plurality of Z, they may be the same as or different from each other.

(2) The polyester compound according to (1), wherein $X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent.

(3) The polyester compound according to (1) or (2), wherein X is an alkylene group optionally having a substituent, a cycloalkylene group optionally having a substituent, an alkenylene group optionally having a substituent, or an alkynylene group optionally having a substituent.

(4) The polyester compound according to any one of (1) to (3), wherein Z is an alkylene group optionally having a substituent or a single bond.

(5) The polyester compound according to any one of (1) to (4), wherein the compound represented by formula (2) is one or more selected from the group consisting of alkanediol optionally having a substituent, cycloalkanediol optionally having a substituent, alkenediol optionally having a substituent, alkynediol optionally having a substituent, a hydrogenated bisphenol optionally having a substituent, polyalkylene glycol optionally having a substituent, dialkanolamine optionally having a substituent, and an aromatic diol having a hydroxyalkyl group bonded to an aromatic ring and optionally having a substituent.

(6) The polyester compound according to any one of (1) to (5), wherein $n^{Dc}$ is 0, and $X^{Dc}$ is a phenylene group optionally having a substituent.

(7) The polyester compound according to any one of (1) to (6), wherein:

i) n is 0, X is an alkylene group having 1 to 10 carbon atoms and optionally having a substituent or a cycloalkylene group having 3 to 10 carbon atoms and optionally having a substituent, or ii) n is 1 or 2, X is an alkylene group having 1 to 6 carbon atoms and optionally having a substituent, Y is an imino group optionally having a substituent, an oxyalkylene group having 1 to 6 carbon atoms and optionally having a substituent, or a phenylene group optionally having a substituent, and Z is an alkylene group having 1 to 3 carbon atoms and optionally having a substituent, or a single bond.

(8) The polyester compound according to any one of (1) to (7), wherein the substituent is selected from the group consisting of a halogen atom, an alkyl group, an aryl group, a hydroxy group, an amino group, and a mercapto group.

(9) The polyester compound according to any one of (1) to (6), wherein the compound represented by formula (2) is one or more selected from the group consisting of compounds of formula (2-1) to formula (2-26):

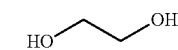
(2-1)

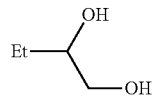
(2-2)

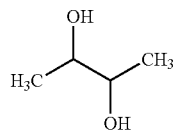
(2-3)

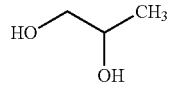
(2-4)

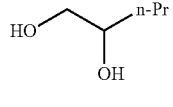
(2-5)

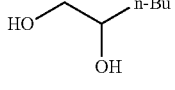
(2-6)

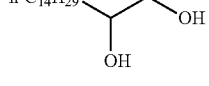
(2-7)

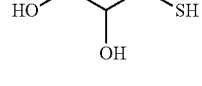
(2-8)

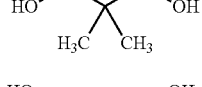
(2-9)

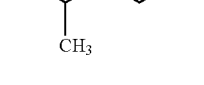
(2-10)

-continued

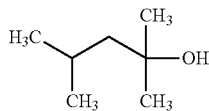
(2-11)

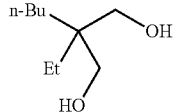
(2-12)

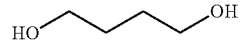
(2-13)

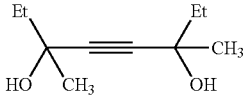
(2-14)

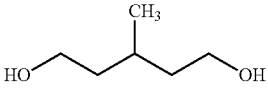
(2-15)

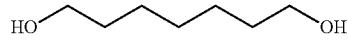
(2-16)

(2-17)

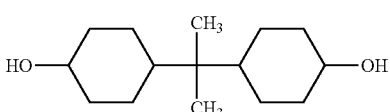
(2-18)

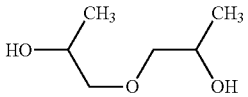
(2-19)

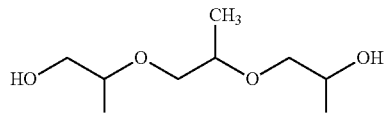
(2-20)

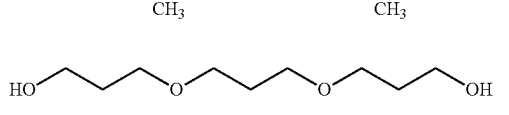
(2-21)

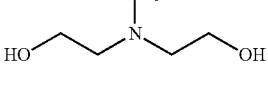
(2-22)

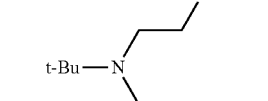
(2-23)

(2-24)

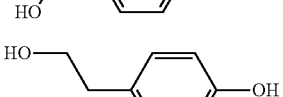
(2-25)

-continued

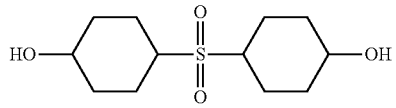

(2-26)

wherein Et represents an ethyl group, n-Pr represents an n-propyl group, n-Bu represents an n-butyl group, and t-Bu represents a tert-butyl group.

(10) The polyester compound according to (9), wherein the compound represented by formula (2) is a compound represented by formula (2-1), formula (2-10), formula (2-13), formula (2-16), formula (2-17), formula (2-19), formula (2-20), formula (2-22), formula (2-24), or formula (2-25).

(11) The polyester compound according to any one of (1) to (10), wherein the polyester compound is obtained by reaction of the compound represented by formula (1), the compound represented by formula (2), and one or more selected from the group consisting of an aromatic dicarboxylic acid, a salt thereof, an ester thereof, and a halide thereof.

(12) The polyester compound according to any one of (1) to (11), wherein the polyester compound is obtained by reaction at a molar ratio of [compound represented by formula (1)]/[compound represented by formula (2)] in a range of 10/1 to 1/10.

(13) The polyester compound according to any one of (1) to (12), wherein the polyester compound is obtained by reaction at a reaction temperature in a range of −10 to 200° C.

(14) A polyester compound comprising one or more selected from the group consisting of structural units of formulae (i) to (iv) below:

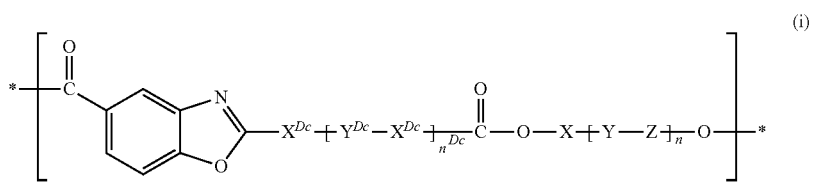

(i)

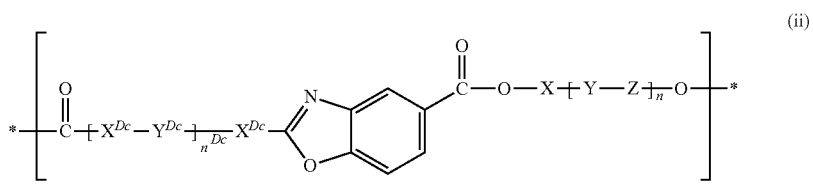

(ii)

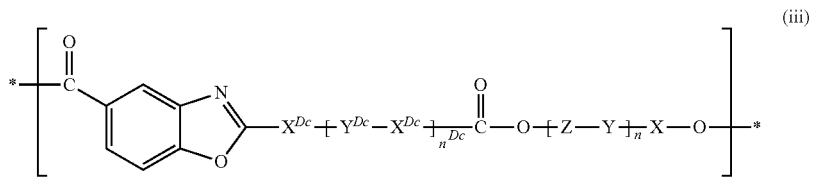

(iii)

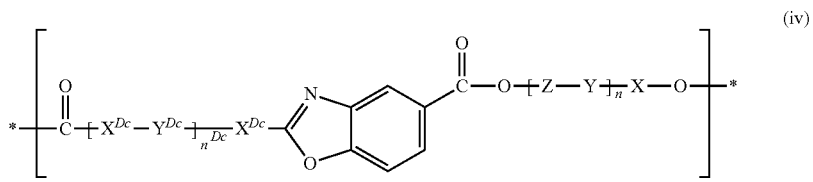

(iv)

wherein $X^{Dc}$ represents a divalent aromatic group optionally having a substituent;

$Y^{Dc}$ represents —O—, —N=N—, a carbonyl group, an alkenylene group optionally having a substituent, or a single bond;

$n^{Dc}$ represents an integer of 0 to 2;

X represents a divalent aliphatic hydrocarbon group optionally having a substituent;

Y represents an imino group optionally having a substituent, a divalent aromatic group optionally having a substituent, an oxyalkylene group optionally having a substituent, a group —S(=O)$_2$—, or an alkylene group optionally having a substituent;

Z represents a divalent aliphatic hydrocarbon group optionally having a substituent or a single bond;

n represents an integer of 0 to 5;

* represents a bond;

when there are a plurality of $X^{Dc}$, they may be the same as or different from each other;

when there are a plurality of $Y^{Dc}$, they may be the same as or different from each other;

when there are a plurality of Y, they may be the same as or different from each other; and when there are a plurality of Z, they may be the same as or different from each other.

(15) The polyester compound according to (14), wherein the polyester compound has an intermediate glass transition point ($T_{mg}$) of 80° C. or higher and 300° C. or lower.

(16) The polyester compound according to (14) or (15), wherein the polyester compound has a melting point ($T_m$) of 140° C. or higher and 500° C. or lower.

(17) The polyester compound according to any one of (14) to (16), wherein the polyester compound has a 5% mass reduction temperature ($T_d$) of 250° C. or higher and 500° C. or lower.

(18) A method of producing a polyester compound, comprising the step of conducting reaction of a compound represented by formula (1):

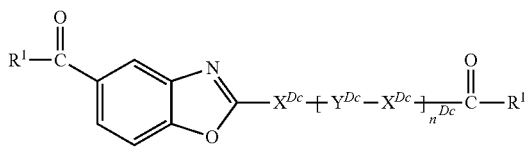

(1)

wherein $R^1$ represents a hydroxy group, a halogen atom, an alkoxy group, a cycloalkyloxy group, an aryloxy group, a group —OM, or a group —O—Si($R^2$)$_3$, where M is a metal atom and $R^2$ is an alkyl group;

$X^{Dc}$ represents a divalent aromatic group optionally having a substituent;

$Y^{Dc}$ represents —O—, —N=N—, a carbonyl group, an alkenylene group optionally having a substituent, or a single bond;

$n^{Dc}$ represents an integer of 0 to 2;

the two $R^1$ may be the same as or different from each other;

when there are a plurality of $X^{Dc}$, they may be the same as or different from each other; and when there are a plurality of $Y^{Dc}$, they may be the same as or different from each other, with a compound represented by formula (2):

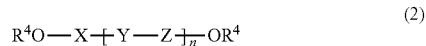

(2)

wherein $R^4$ represents a hydrogen atom, an acyl group, or a group —Si($R^5$)$_3$, where $R^5$ is an alkyl group;

X represents a divalent aliphatic hydrocarbon group optionally having a substituent;

Y represents an imino group optionally having a substituent, a divalent aromatic group optionally having a substituent, an oxyalkylene group optionally having a substituent, a group —S(=O)$_2$—, or an alkylene group optionally having a substituent;

Z represents a divalent aliphatic hydrocarbon group optionally having a substituent or a single bond;

n represents an integer of 0 to 5;

the two $R^4$ may be the same as or different from each other;

when there are a plurality of Y, they may be the same as or different from each other; and when there are a plurality of Z, they may be the same as or different from each other, at a molar ratio of [compound represented by formula (1)]/[compound represented by formula (2)] in a range of 10/1 to 1/10.

The present invention provides novel polyester compounds with high thermal resistance.

DETAILED DESCRIPTION OF THE PREFERRED EMBODIMENTS

In the present description, a "divalent aromatic group" refers to a group in which two hydrogen atoms are removed from an aromatic ring of an aromatic compound, and includes an arylene group and a heteroarylene group.

In the present description, the term "$C_p$-$C_q$" (p and q are positive integers and satisfy p<q) denotes that the number of carbon atoms in the organic group described immediately after this term is p to q. For example, "$C_1$-$C_{12}$ alkyl group" denotes an alkyl group having 1 to 12 carbon atoms, "$C_1$-$C_{12}$ alkyl ester" refers to an ester with an alkyl group having 1 to 12 carbon atoms.

In the present description, the term "optionally having a substituent" immediately following a compound or group refers to both the case where a hydrogen atom of the compound or group is not substituted with a substituent and the case where some or all of hydrogen atoms of the compound or group are substituted with substituents.

In the present description, the term "substituent" means a halogen atom, an alkyl group, a cycloalkyl group, an alkoxy group, a cycloalkyloxy group, an aryl group, an aryloxy group, an arylalkyl group, an arylalkoxy group, a monovalent heterocyclic group, an alkylidene group, an amino group, a silyl group, an acyl group, an acyloxy group, a carboxy group, a cyano group, a nitro group, a hydroxy group, a mercapto group, and an oxo group, unless otherwise specified.

Examples of the halogen atom used as a substituent include a fluorine atom, a chlorine atom, a bromine atom, and an iodine atom.

The alkyl group used as a substituent may be either linear or branched. The number of carbon atoms in the alkyl group is preferably 1 to 20, more preferably 1 to 14, further preferably 1 to 12, even more preferably 1 to 6, and particularly preferably 1 to 3. Examples of the alkyl group include a methyl group, an ethyl group, a propyl group, an isopropyl group, a butyl group, a sec-butyl group, an isobutyl group, a tert-butyl group, a pentyl group, a hexyl group, a heptyl group, an octyl group, a nonyl group, and a decyl group. As will be described later, the alkyl group used as a substituent may further have a substituent ("additional substituent"). Examples of the alkyl group having such an additional substituent include an alkyl group substituted with a halogen atom, specifically, a trifluoromethyl group, a trichloromethyl group, a tetrafluoroethyl group, and a tetrachloroethyl group.

The number of carbon atoms in the cycloalkyl group used as a substituent is preferably 3 to 20, more preferably 3 to 12, and further preferably 3 to 6. Examples of the cycloalkyl group include a cyclopropyl group, a cyclobutyl group, a cyclopentyl group, and a cyclohexyl group.

The alkoxy group used as a substituent may be either linear or branched. The number of carbon atoms in the alkoxy group is preferably 1 to 20, preferably 1 to 12, further preferably 1 to 6. Examples of the alkoxy group include a methoxy group, an ethoxy group, a propyloxy group, an isopropyloxy group, a butoxy group, a sec-butoxy group, an isobutoxy group, a tert-butoxy group, a pentyloxy group, a hexyloxy group, a heptyloxy group, an octyloxy group, a nonyloxy group, and a decyloxy group.

The number of carbon atoms in the cycloalkyloxy group used as a substituent is preferably 3 to 20, more preferably 3 to 12, and further preferably 3 to 6. Examples of the cycloalkyloxy group include a cyclopropyloxy group, a cyclobutyloxy group, a cyclopentyloxy group, and a cyclohexyloxy group.

The aryl group used as a substituent is a group in which one hydrogen atom is removed from an aromatic ring of an aromatic hydrocarbon. The number of carbon atoms in the aryl group used as a substituent is preferably 6 to 24, more preferably 6 to 18, further preferably 6 to 14, even more preferably 6 to 12, and particularly preferably 6 to 10. Examples of the aryl group include a phenyl group, a naphthyl group, and an anthracenyl group.

The number of carbon atoms in the aryloxy group used as a substituent is preferably 6 to 24, more preferably 6 to 18, further preferably 6 to 14, even more preferably 6 to 12, and particularly preferably 6 to 10. Examples of the aryloxy group used as a substituent include a phenoxy group, a 1-naphthyloxy group, and a 2-naphthyloxy group.

The number of carbon atoms in the arylalkyl group used as a substituent is preferably 7 to 25, more preferably 7 to 19, further preferably 7 to 15, even more preferably 7 to 13, and particularly preferably 7 to 11. Examples of the arylalkyl group include a phenyl-$C_1$-$C_{12}$ alkyl group, a naphthyl-$C_1$-$C_{12}$ alkyl group, and an anthracenyl-$C_1$-$C_{12}$ alkyl group.

The number of carbon atoms in the arylalkoxy group used as a substituent is preferably 7 to 25, more preferably 7 to 19, further preferably 7 to 15, even more preferably 7 to 13, and particularly preferably 7 to 11. Examples of the arylalkoxy group include a phenyl-$C_1$-$C_{12}$ alkoxy group and a naphthyl-$C_1$-$C_{12}$ alkoxy group.

The monovalent heterocyclic group used as a substituent refers to a group in which one hydrogen atom is removed from a hetero ring of a heterocyclic compound. The number of carbon atoms in the monovalent heterocyclic group is preferably 3 to 21, more preferably 3 to 15, and further preferably 3 to 9. A monovalent aromatic heterocyclic group (heteroaryl group) is also included in the monovalent heterocyclic group. Examples of the monovalent hetero ring include a thienyl group, a pyrrolyl group, a furyl group, a pyridyl group, a pyridazinyl group, a pyrimidyl group, a pyrazinyl group, a triazinyl group, a pyrrolidyl group, a piperidyl group, a quinolyl group, and an isoquinolyl group.

The alkylidene group used as a substituent refers to a group in which two hydrogen atoms are removed from the same carbon atom of an alkane. The number of carbon atoms in the alkylidene group is preferably 1 to 20, more preferably 1 to 14, further preferably 1 to 12, even more preferably 1 to 6, and particularly preferably 1 to 3. Examples of the alkylidene group include a methylidene group, an ethylidene group, a propylidene group, an isopropylidene group, a butylidene group, a sec-butylidene group, an isobutylidene group, a tert-butylidene group, a pentylidene group, a hexylidene group, a heptylidene group, an octylidene group, a nonylidene group, and a decylidene group.

The acyl group used as a substituent refers to a group represented by formula —C(=O)—R (where R is an alkyl group or an aryl group). The alkyl group represented by R may be either linear or branched. Examples of the aryl group represented by R include a phenyl group, a naphthyl group, and an anthracenyl group. The number of carbon atoms in the acyl group is preferably 2 to 20, more preferably 2 to 13, and further preferably 2 to 7. Examples of the acyl group include an acetyl group, a propionyl group, a butyryl group, an isobutyryl group, a pivaloyl group, and a benzoyl group.

The acyloxy group used as a substituent refers to a group represented by formula —O—C(=O)—R (where R is an alkyl group or an aryl group). The alkyl group represented by R may be either linear or branched. Examples of the aryl group represented by R include a phenyl group, a naphthyl group, and an anthracenyl group. The number of carbon atoms in the acyloxy group is preferably 2 to 20, more preferably 2 to 13, and further preferably 2 to 7. Examples of the acyloxy group include an acetoxy group, a propionyloxy group, a butyryloxy group, an isobutyryloxy group, a pivaloyloxy group, and a benzoyloxy group.

The substituent as described above may further have a substituent (hereinafter may be referred to as 'additional substituent"). The same substituent as described above may be used as the additional substituent, unless otherwise specified.

The present invention will be described in details below with reference to preferable embodiments thereof.

Polyester Compound.

The polyester compound of the present invention is obtained by reaction of a compound represented by formula (1):

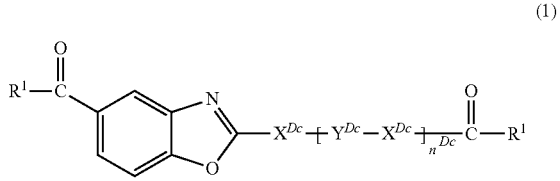

(1)

wherein $R^1$ represents a hydroxy group, a halogen atom, an alkoxy group, a cycloalkyloxy group, an aryloxy group, a group —OM, or a group —O—Si($R^2$)$_3$, where M is a metal atom and $R^2$ is an alkyl group;

$X^{Dc}$ represents a divalent aromatic group optionally having a substituent;

$Y^{Dc}$ represents —O—, —N=N—, a carbonyl group, an alkenylene group optionally having a substituent, or a single bond;

$n^{Dc}$ represents an integer of 0 to 2;

the two $R^1$ may be the same as or different from each other;

when there are a plurality of $X^{Dc}$, they may be the same as or different from each other; and when there are a plurality of $Y^{Dc}$, they may be the same as or different from each other, with a compound represented by formula (2):

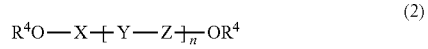

$$R^4O-X+Y-Z+_nOR^4 \qquad (2)$$

wherein $R^4$ represents a hydrogen atom, an acyl group, or a group —Si(R$^5$)$_3$, where $R^5$ is an alkyl group;

X represents a divalent aliphatic hydrocarbon group optionally having a substituent;

Y represents an imino group optionally having a substituent, a divalent aromatic group optionally having a substituent, an oxyalkylene group optionally having a substituent, a group —S(=O)$_2$—, or an alkylene group optionally having a substituent;

Z represents a divalent aliphatic hydrocarbon group optionally having a substituent or a single bond;

n represents an integer of 0 to 5;

the two $R^4$ may be the same as or different from each other;

when there are a plurality of Y, they may be the same as or different from each other; and when there are a plurality of Z, they may be the same as or different from each other.

In Formula (1), $R^1$ represents a hydroxy group, a halogen atom, an alkoxy group, a cycloalkyloxy group, an aryloxy group, a group —OM, or a group —O—Si(R$^2$)$_3$. Here, M is a metal atom, and $R^2$ is an alkyl group. The two $R^1$ may be the same as or different from each other.

Examples of the halogen atom represented by $R^1$ include a fluorine atom, a chlorine atom, a bromine atom, and an iodine atom. A chlorine atom is preferable.

The alkoxy group represented by $R^1$ may be either linear or branched. The number of carbon atoms in the alkoxy group is preferably 1 to 10, more preferably 1 to 6, and further preferably 1 to 4. Examples of the alkoxy group represented by $R_1$ include a methoxy group, an ethoxy group, a propoxy group, an isopropyloxy group, a butoxy group, a sec-butyloxy group, an isobutyloxy group, a tert-butyloxy group, a pentyloxy group, a hexyloxy group, a heptyloxy group, an octyloxy group, a nonyloxy group, and a decyloxy group.

The number of carbon atoms in the cycloalkyloxy group represented by $R^1$ is preferably 3 to 10 and more preferably 3 to 6. Examples of the cycloalkyloxy group represented by $R^1$ include a cyclopropyloxy group, a cyclobutyloxy group, a cyclopentyloxy group, and a cyclohexyloxy group.

The number of carbon atoms in the aryloxy group represented by $R^1$ is preferably 6 to 18, more preferably 6 to 14, and further preferably 6 to 10. Examples of the aryloxy group include a phenyloxy group, a naphthyloxy group, and an anthracenyloxy group.

When $R^1$ is a group —OM (where M is a metal atom), examples of the metal atom represented by M include alkaline metals. A lithium atom, a sodium atom, a potassium atom, and a cesium atom are preferable, and a potassium atom is more preferable.

When $R^1$ is a group —O—Si(R$^2$)$_3$ (where $R^2$ is an alkyl group), the alkyl group represented by $R^2$ may be either linear or branched. The number of carbon atoms in the alkyl group represented by $R^2$ is preferably 1 to 10, more preferably 1 to 6, further preferably 1 to 4, even more preferably 1 to 3, and particularly preferably 1 or 2. In a group —O—Si(R$^2$)$_3$, the three $R^2$ may be the same as or different from each other. A preferable specific example of the group —O—Si(R$^2$)$_3$ is a trimethylsilyloxy group.

$R^1$ is preferably a hydroxy group, a halogen atom or an alkoxy group, more preferably a hydroxy group or a halogen atom, and further preferably a hydroxy group.

In formula (1), $X^{Dc}$ represents a divalent aromatic group optionally having a substituent.

Examples of the divalent aromatic group in $X^{Dc}$ include an arylene group and a heteroarylene group. An arylene group having 6 to 24 carbon atoms and a heteroarylene group having 3 to 21 carbon atoms are preferable. An arylene group having 6 to 18 carbon atoms and a heteroarylene group having 3 to 15 carbon atoms are more preferable. An arylene group having 6 to 14 carbon atoms and a heteroarylene group having 3 to 9 carbon atoms are further preferable. An arylene group having 6 to 10 carbon atoms and a heteroarylene group having 3 to 6 carbon atoms are even more preferable. The number of carbon atoms described above does not include the number of carbon atoms of the substituent.

Specific examples of the divalent aromatic group in $X^{Dc}$ include a phenylene group, a naphthylene group, an anthracenylene group, a pyrenediyl group, a pyrrolediyl group, a furandiyl group, a thiophenediyl group, a pyridinediyl group, a pyridazinediyl group, a pyrimidinediyl group, a pyrazinediyl group, a triazinediyl group, a pyrrolinediyl group, a piperidinediyl group, a triazolediyl group, a purinediyl group, an anthraquinonediyl group, a carbazolediyl group, a fluorenediyl group, a quinolinediyl group, and an isoquinolinediyl group.

In view of obtaining a polyester compound with high thermal resistance, the divalent aromatic group in $X^{Dc}$ is preferably an arylene group having 6 to 14 carbon atoms or a heteroarylene group having 3 to 9 carbon atoms, more preferably a phenylene group, a naphthylene group, an anthracenylene group, a furandiyl group, a pyridinediyl group, a thiophenediyl group, or a quinolinediyl, and further preferably a phenylene group or a naphthylene.

The substituent that the divalent group in $X^{Dc}$ may have is as previously mentioned. When the divalent group in $X^{Dc}$ has a plurality of substituents, they may be the same as or different from each other. Among them, the substituent that the divalent group in $X^{Dc}$ may have is preferably one or more groups selected from the group consisting of a halogen atom, an alkyl group, an aryl group, a hydroxy group, an amino group, and a mercapto group, preferably one or more groups selected from the group consisting of a halogen atom, an alkyl group, an aryl group, a hydroxy group, and an amino group. Among those, in the case of a halogen atom, a chlorine atom, a fluorine atom, or a bromine atom is preferable. In the case of an alkyl group, a $C_1$-$C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent. Thus, the substituent in the present invention includes also a fluoroalkyl group such as a trifluoromethyl, as a matter of course.

In a preferable embodiment, $X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent.

In a further preferable embodiment, $X^{Dc}$ is a phenylene group optionally having a substituent or a naphthylene group optionally having a substituent.

In formula (1), $Y^{Dc}$ represents —O—, —N=N—, a carbonyl group, an alkenylene group optionally having a substituent, or a single bond.

The number of carbon atoms in the alkenylene group in $Y^{Dc}$ is preferably 2 to 10, more preferably 2 to 6, further preferably 2 or 3, and even more preferably 2. The number of carbon atoms described above does not include the number of carbon atoms of the substituent. Examples of the alkenylene group include an ethenylene group, a propenylene group, a butenylene group, a pentenylene group, a hexenylene group, a heptenylene group, an octenylene group, a nonenylene group, and a decenylene group.

The substituent that the alkenylene group in $X^{Dc}$ may have is as previously mentioned. When the alkenylene group in $Y^{Dc}$ has a plurality of substituents, they may be the same as or different from each other. Among them, the substituent that the alkenylene group in $Y^{Dc}$ may have is preferably one or more groups selected from the group consisting of a halogen atom, an alkyl group, an aryl group, a hydroxy group, an amino group, and a mercapto group, preferably one or more groups selected from the group consisting of a halogen atom, an alkyl group, an aryl group, a hydroxy group, and an amino group. Among those, in the case of a halogen atom, a chlorine atom, a fluorine atom, or a bromine atom is preferable. In the case of an alkyl group, a $C_1$ to $C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent. Thus, the substituent in the present invention includes also a fluoroalkyl group such as a trifluoromethyl group, as a matter of course.

In formula (1), $n^{Dc}$ represents an integer of 0 to 2, preferably 0 or 1, and more preferably 0. When there are a plurality of $X^{Dc}$, they may be the same as or different from each other. When there are a plurality of $Y^{Dc}$, they may be the same as or different from each other.

In formula (1), when $n^{Dc}$ is 0, $X^{Dc}$ is preferably a phenylene group optionally having a substituent, a naphthylene group optionally having a substituent, an anthracenylene group optionally having a substituent, a furandiyl group optionally having a substituent, a pyridinediyl group optionally having a substituent, or a thiophenediyl group optionally having a substituent, and more preferably a phenylene group optionally having a substituent or a naphthylene group optionally having a substituent.

In formula (1), when $n^{Dc}$ is 1 or 2, $X^{Dc}$ is a phenylene group optionally having a substituent, a pyridinediyl group optionally having a substituent, or a quinolinediyl group optionally having a substituent, $Y^{Dc}$ is —O—, —N=N—, a carbonyl group, an alkenylene group optionally having a substituent, or a single bond.

In a preferable embodiment, in formula (1), $n^{Dc}$ is 0, and $X^{Dc}$ is a phenylene group optionally having a substituent.

In a further preferable embodiment, in formula (1), $n^{Dc}$ is 0, and $X^{Dc}$ is a phenylene group optionally having one or more substituents selected from the group consisting of a halogen atom, an alkyl group, an aryl group, a hydroxy group, and an amino group.

In formula (1), examples of the preferable combination of $X^{Dc}$, $Y^{Dc}$ and $n^{Dc}$ include the combinations (1) to (35) in Tables 1-1 to 1-4 below. In the tables, * indicates a bond. In the combinations (1) to (35) below, the divalent group represented as $X^{Dc}$ has a substituent at a particular position but the position of the substituent is not particularly limited. A group having a substituent at a different position may also be suitably used as $X^{Dc}$.

TABLE 1-1

| | $X^{Dc}$ | $Y^{Dc}$ | $n^{Dc}$ |
|---|---|---|---|
| (1) | *—⌬—* | — | 0 |
| (2) | 1,3-phenylene | — | 0 |
| (3) | 1,2-phenylene | — | 0 |
| (4) | 5-amino-1,3-phenylene (H₂N-) | — | 0 |
| (5) | 3-fluoro-1,2-phenylene (F-) | — | 0 |
| (6) | 5-hydroxy-1,3-phenylene (HO-) | — | 0 |
| (7) | 2,5-furandiyl | — | 0 |
| (8) | 2,3-pyridinediyl | — | 0 |

TABLE 1-1-continued
| | $X^{Dc}$ | $Y^{Dc}$ | $n^{Dc}$ |
|---|---|---|---|
| (9) | 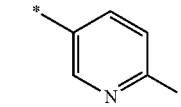 | — | 0 |
TABLE 1-2
| | $X^{Dc}$ | $Y^{Dc}$ | $n^{Dc}$ |
|---|---|---|---|
| (10) | 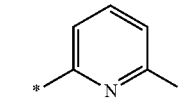 | — | 0 |
| (11) | 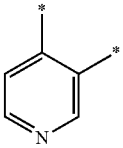 [SMILES: *c1ccncc1*] | — | 0 |
| (12) | 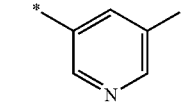 | — | 0 |
| (13) | 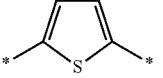 [SMILES: *c1ccc(*)s1] | — | 0 |
| (14) | 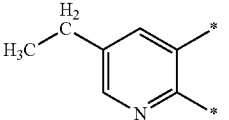 [SMILES: *c1cc(CC)cnc1*] | — | 0 |
| (15) | 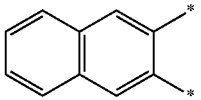 [SMILES: *c1cc2ccccc2cc1*] | — | 0 |
| (16) | 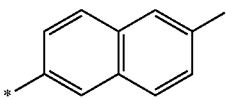 | — | 0 |
| (17) | 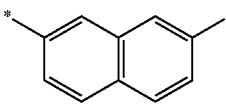 | — | 0 |
| (18) | 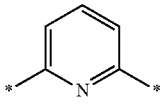 | — | 0 |
TABLE 1-3
| | $X^{Dc}$ | $Y^{Dc}$ | $n^{Dc}$ |
|---|---|---|---|
| (19) | 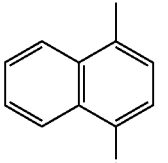 | — | 0 |
| (20) | 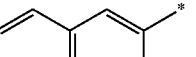 | — | 0 |
| (21) | 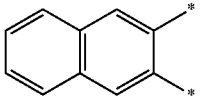 [SMILES: *c1cc2ccccc2cc1*] | — | 0 |
| (22) | 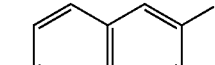 | — | 0 |
| (23) |  | Single bond | 1 |
| (24) |  | Single bond | 1 |
| (25) |  | 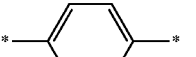 | 1 |
| (26) | 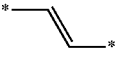 | 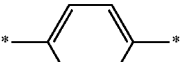 | 1 |
TABLE 1-4
| | $X^{Dc}$ | $Y^{Dc}$ | $n^{Dc}$ |
|---|---|---|---|
| (27) | 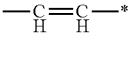 | *—O—* | 1 |
| (28) |  | *—N=N—* | 1 |
| (29) |  | *—N=N—* | 1 |

TABLE 1-4-continued

| | $X^{Dc}$ | $Y^{Dc}$ | $n^{Dc}$ |
|---|---|---|---|
| (30) | *—⬡—* | *—N=N—* | 1 |
| (31) | *—⬡—* | *—C(=O)—* | 1 |
| (32) | (3-pyridyl, 2-position) | Single bond | 1 |
| (33) | (4-pyridyl, 2-position) | Single bond | 1 |
| (34) | (5-pyridyl, 2-position) | Single bond | 1 |
| (35) | (4-quinolyl, 2-position) | Single bond | 1 |

Among them, the combination of $X^{Dc}$, $Y^{Dc}$ and $n^{Dc}$ is preferably (1) to (6) and (16) to (21) above, and more preferably (1) to (3) and (16) to (21) above.

In another embodiment, the compound represented by formula (1) is a compound represented by formula (1'):

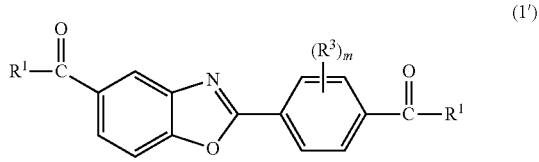

(1')

wherein
$R^1$ represents the same as defined above;
$R^3$ represents a substituent;
m represents an integer of 0 to 4;
the two $R^1$ may be the same as or different from each other; and
when there are a plurality of $R^3$, they may be the same as or different from each other.

In formula (1'), $R^3$ represents a substituent. The substituent represented by $R^3$ is as previously mentioned. Among them, the substituent represented by $R^3$ is preferably a halogen atom, an alkyl group, an aryl group, a hydroxy group, an amino group, or a mercapto group, more preferably a halogen atom, an alkyl group, an aryl group, a hydroxy group, or an amino group. These substituents may have an additional substituent.

In formula (1'), m represents an integer of 0 to 4. Preferably, m is 0 to 2, more preferably 0 or 1, and further preferably 0. When there are a plurality of $R^3$, they may be the same as or different from each other.

In a preferable embodiment, the compound represented by formula (1) is 2-(4-carboxyphenyl)benzo[d]oxazole-5-carboxylic acid represented by Formula (1-1) (hereinafter may be abbreviated as "4CBOC"):

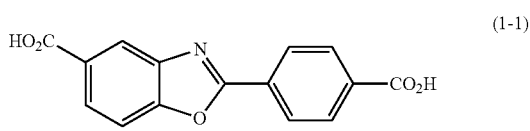 [SMILES: O=C(O)c1ccc(-c2nc3cc(C(=O)O)ccc3o2)cc1]

(1-1)

The compound represented by formula (1) may be used singly or in combination of two or more thereof.

The method of producing the compound represented by formula (1) is not particularly limited. The compound represented by formula (1) may be produced by any conventionally known method. For example, 4CBOC can be produced by the method described in Examples below.

In formula (2), $R^4$ represents a hydrogen atom, an acyl group, or a group —Si($R^5$)$_3$. Here, $R^5$ is an alkyl group.

The acyl group represented by $R^4$ refers to a group represented by formula —C(=O)—R (where R is an alkyl group). The alkyl group represented by R may be either linear or branched. The number of carbon atoms in the acyl group represented by $R^4$ is preferably 2 to 5, more preferably 2 or 3, and further preferably 2. A preferable specific example of the acyl group represented by $R^4$ is an acetyl group.

When $R^4$ is a group —Si($R^5$)$_3$ (where $R^5$ is an alkyl group), the alkyl group represented by $R^5$ may be either linear or branched. The number of carbon atoms in the alkyl group represented by $R^5$ is preferably 1 to 10, more preferably 1 to 6, further preferably 1 to 4, even more preferably 1 to 3, and particularly preferably 1 or 2. In a group —Si($R^5$)$_3$, the three $R^5$ may be the same as or different from each other. A preferable specific example of a group —Si($R^5$)$_3$ is a trimethylsilyl group.

$R^4$ is preferably a hydrogen atom or an acyl group, and more preferably a hydrogen atom.

In formula (2), X represents a divalent aliphatic hydrocarbon group optionally having a substituent. The divalent aliphatic hydrocarbon group may be either a saturated hydrocarbon group or an unsaturated hydrocarbon group, and the number of carbon atoms thereof is preferably 1 to 60, more preferably 1 to 40, further preferably 1 to 30, even more preferably 1 to 20, and particularly preferably 1 to 10, or 1 to 6. The number of carbon atoms described above does not include the number of carbon atoms of the substituent.

Examples of the divalent aliphatic hydrocarbon group in X include an alkylene group, a cycloalkylene group, an alkenylene group, a cycloalkenylene group, an alkynylene group, a cycloalkynylene group, an alkapolyenylene group (the number of double bonds is preferably 2 to 10, more preferably 2 to 6, further preferably 2 to 4, and even more preferably 2), an alkadiynylene group, and an alkatriynylene group. Among them, an alkylene group, a cycloalkylene group, an alkenylene group, and an alkynylene group are preferable. In a preferable embodiment, therefore, X is an alkylene group optionally having a substituent, a cycloalkylene group optionally having a substituent, an alkenylene group optionally having a substituent, or an alkynylene group optionally having a substituent.

The number of carbon atoms in the alkylene group in X is preferably 1 to 60, more preferably 1 to 40, further preferably 1 to 30, even more preferably 1 to 20, and particularly preferably 1 to 10, 1 to 6, or 1 to 3. The number of carbon atoms described above does not include the number of carbon atoms of the substituent. Examples of the alkylene group include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, and an eicocylene group.

The number of carbon atoms in the cycloalkylene group in X is preferably 3 to 10 and more preferably 3 to 6. The number of carbon atoms described above does not include the number of carbon atoms of the substituent. Examples of the cycloalkylene group include a cyclopropylene group, a cyclobutylene group, a cyclopentylene group, and a cyclohexylene group.

The number of carbon atoms in the alkenylene group in X is preferably 2 to 60, more preferably 2 to 40, further preferably 2 to 30, even more preferably 2 to 20, and particularly preferably 2 to 10, 2 to 6, or 2 to 3. The number of carbon atoms described above does not include the number of carbon atoms of the substituent. Examples of the alkenylene group include an ethenylene group, a propenylene group, a butenylene group, a pentenylene group, a hexenylene group, a heptenylene group, an octenylene group, a nonenylene group, a decenylene group, an undecenylene group, a dodecenylene group, a tridecenylene group, a tetradecenylene group, a pentadecenylene group, a hexadecenylene group, a heptadecenylene group, an octadecenylene group, a nonadecenylene group, and an eicosenylene group.

The number of carbon atoms in the alkynylene group in X is preferably 2 to 60, more preferably 2 to 40, further preferably 2 to 30, even more preferably 2 to 20, and particularly preferably 2 to 10, 2 to 6, or 2 to 3. The number of carbon atoms described above does not include the number of carbon atoms of the substituent. Examples of the alkynylene group include an ethynylene group, a propynylene group, a butynylene group, a pentynylene group, a hexynylene group, a heptynylene group, and an octynylene group.

The substituent that the divalent aliphatic hydrocarbon group may have is as previously mentioned. When the divalent aliphatic hydrocarbon group in X has a plurality of substituents, they may be the same as or different from each other. Among them, the substituent that the divalent aliphatic hydrocarbon group in X may have is preferably one or more groups selected from the group consisting of a halogen atom, an alkyl group, an aryl group, a hydroxy group, an amino group, and a mercapto group, and more preferably one or more groups selected from the group consisting of a halogen atom, an alkyl group, and a mercapto group. Among those, in the case of a halogen atom, a chlorine atom, a fluorine atom, or a bromine atom is preferable. In the case of an alkyl group, a $C_1$-$C_{20}$ alkyl group is preferable, a $C_1$-$C_6$ alkyl group is more preferable, and a $C_1$-$C_3$ alkyl group is further preferable. In the case of an aryl group, a phenyl group is preferable. These substituents may have an additional substituent. Thus, the substituent in the present invention includes also a fluoroalkyl group such as a trifluoromethyl group, as a matter of course.

In formula (2), Y is an imino group optionally having a substituent, a divalent aromatic group optionally having a substituent, an oxyalkylene group optionally having a substituent, a group —S(=O)$_2$—, or an alkylene group optionally having a substituent, in view of obtaining a polyester compound with high thermal resistance.

Examples of the divalent aromatic group in Y include an arylene group and a heteroarylene group. An arylene group having 6 to 24 carbon atoms and a heteroarylene group having 3 to 21 carbon atoms are preferable. An arylene group having 6 to 18 carbon atoms and a heteroarylene group having 3 to 15 carbon atoms are more preferable. An arylene group having 6 to 14 carbon atoms and a heteroarylene group having 3 to 9 carbon atoms are further preferable. An arylene group having 6 to 12 carbon atoms and a heteroarylene group having 3 to 9 carbon atoms are even more preferable. An arylene group having 6 to 10 carbon atoms and a heteroarylene group having 3 to 6 carbon atoms are particularly preferable. The number of carbon atoms described above does not include the number of carbon atoms of the substituent.

Specific examples of the divalent aromatic group in Y include a phenylene group, a naphthylene group, an anthracenylene group, a thiophenediyl group, a pyrrolediyl group, a furandiyl group, a pyridinediyl group, a pyridazinediyl group, a pyrimidinediyl group, a pyrazinediyl group, a triazinediyl group, a pyrrolinediyl group, a piperidinediyl group, a quinolinediyl group, and an isoquinolinediyl group. Among them, in view of obtaining a polyester compound with high thermal resistance, the divalent aromatic group in Y is preferably an arylene group having 6 to 12 carbon atoms, more preferably a phenylene group and a naphthylene group, and further preferably a phenylene group.

The number of carbon atoms in the oxyalkylene group in Y is preferably 1 to 20, more preferably 1 to 12, further preferably 2 to 4, and even more preferably 2 or 3. The number of carbon atoms described above does not include the number of carbon atoms of the substituent.

Specific examples of the oxyalkylene group in Y include an oxyethylene group, an oxypropylene group, an oxybutylene group, an oxypentylene group, an oxyhexylene group, an oxyheptylene group, an oxyoctylene group, an oxynonylene group, and an oxydecylene group.

The number of carbon atoms in the alkylene group in Y is preferably 1 to 10, more preferably 1 to 6, and further preferably 1 to 3. The number of carbon atoms described above does not include the number of carbon atoms of the substituent. Among them, in view of obtaining a polyester compound with high thermal resistance, the alkylene group in Y is preferably a methylene group.

The substituent that the divalent group in Y may have is as previously mentioned. When the divalent group in Y has a plurality of substituents, they may be the same as or different from each other. Among them, the substituent that the divalent group in Y may have is preferably one or more groups selected from the group consisting of a halogen atom, an alkyl group, an aryl group, a hydroxy group, an amino group, and a mercapto group, and more preferably one or more groups selected from the group consisting of a halogen atom, an alkyl group, and an aryl group. Among those, in the case of a halogen atom, a chlorine atom, a fluorine atom, or a bromine atom is preferable. In the case of an alkyl group, a $C_1$-$C_{20}$ alkyl group is preferable, a $C_1$-$C_6$ alkyl group is more preferable, and a $C_1$-$C_3$ alkyl group is further preferable. In the case of an aryl group, a phenyl group is preferable. These substituents may have an additional substituent.

When Y is a methylene group having two substituents, the two substituents may be bonded to each other to form a ring.

In such a case, examples of Y include a 9H-fluorene-9,9-diyl group and a 1,1-cyclohexanediyl group.

In formula (2), Z represents a divalent aliphatic hydrocarbon group optionally having a substituent or a single bond.

The divalent aliphatic hydrocarbon group in Z may be either a saturated hydrocarbon group or an unsaturated hydrocarbon group, and the number of carbon atoms thereof is preferably 1 to 60, more preferably 1 to 40, further preferably 1 to 30, and even more preferably 1 to 20. The number of carbon atoms described above does not include the number of carbon atoms of the substituent.

Examples of the divalent aliphatic hydrocarbon group in Z include an alkylene group, a cycloalkylene group, an alkenylene group, a cycloalkenylene group, an alkynylene group, a cycloalkynylene group, an alkapolyenylene group (the number of double bonds is preferably 2 to 10, more preferably 2 to 6, further preferably 2 to 4, and even more preferably 2), an alkadiynylene group, and an alkatriynylene group. Among them, an alkylene group, a cycloalkylene group, an alkenylene group, and an alkynylene group are preferable, and an alkylene group is more preferable.

Specific examples of the alkylene group, the cycloalkylene group, the alkenylene group, and the alkynylene group in Z are the same as those described for the alkylene group, the cycloalkylene group, the alkenylene group, and the alkynylene group in X.

The substituent that the divalent aliphatic hydrocarbon group in Z may have is as previously mentioned. When the divalent aliphatic hydrocarbon group in Z has a plurality of substituents, they may be the same as or different from each other. Among them, the substituent that the divalent aliphatic hydrocarbon group in Z may have is preferably one or more groups selected from the group consisting of a halogen atom, an alkyl group, an aryl group, a hydroxy group, an amino group, and a mercapto group, and more preferably one or more groups selected from the group consisting of a halogen atom, an alkyl group, and a mercapto group. Among those, in the case of a halogen atom, a chlorine atom, a fluorine atom, or a bromine atom is preferable. In the case of an alkyl group, a $C_1$-$C_{20}$ alkyl group is preferable, a $C_1$-$C_6$ alkyl group is more preferable, and a $C_1$-$C_3$ alkyl group is further preferable. In the case of an aryl group, a phenyl group is preferable. These substituents may have an additional substituent.

In a preferable embodiment, in formula (2), Z is an alkylene group optionally having a substituent or a single bond.

In formula (2), n represents an integer of 0 to 5, preferably an integer of 0 to 4, more preferably an integer of 0 to 3, and further preferably an integer of 0 to 2. When there are a plurality of Y, they may be the same as or different from each other. When there are a plurality of Z, they may be the same as or different from each other.

In formula (2), when n is 0, it is preferable that X is an alkylene group optionally having a substituent, a cycloalkylene group optionally having a substituent, an alkenylene group optionally having a substituent, or an alkynylene group optionally having a substituent.

In formula (2), when n is an integer of 1 to 5, it is preferable that X is an alkylene group optionally having a substituent, a cycloalkylene group optionally having a substituent, an alkenylene group optionally having a substituent, or an alkynylene group optionally having a substituent, Y is an imino group optionally having a substituent, a divalent aromatic group optionally having a substituent, an oxyalkylene group optionally having a substituent, a group —S(=O)$_2$—, or an alkylene group optionally having a substituent, and Z is an alkylene group optionally having a substituent or a single bond.

In a preferable embodiment, in formula (2), i) n is 0, and X is an alkylene group having 1 to 10 carbon atoms and optionally having a substituent or a cycloalkylene group having 3 to 10 carbon atoms and optionally having a substituent, or ii) n is 1 or 2, X is an alkylene having 1 to 6 carbon atoms and optionally having a substituent, Y is an imino group optionally having a substituent, an oxyalkylene group having 1 to 6 carbon atoms and optionally having a substituent, or a phenylene group optionally having a substituent, and Z is an alkylene group having 1 to 3 carbon atoms and optionally having a substituent, or a single bond.

In a further preferable embodiment, in formula (2), i) n is 0, and X is an alkylene group having 1 to 10 carbon atoms and optionally having one or more substituents selected from the group consisting of a halogen atom, an alkyl group, and a mercapto group, or a cycloalkylene group having 3 to 10 carbon atoms and optionally having one or more substituents selected from the group consisting of a halogen atom, an alkyl group, and a mercapto group, or ii) n is 1 or 2, X is an alkylene group having 1 to 6 carbon atoms and optionally having one or more substituents selected from the group consisting of a halogen atom, an alkyl group, and a mercapto group, Y is an imino group optionally having one or more substituents selected from the group consisting of a halogen atom, an alkyl group, and an aryl group, an oxyalkylene group having 1 to 6 carbon atoms and optionally having one or more substituents selected from the group consisting of a halogen atom, an alkyl group, and an aryl group, or a phenylene group optionally having one or more substituents selected from the group consisting of a halogen atom, an alkyl group, and an aryl group, and Z is an alkylene group having 1 to 3 carbon atoms and optionally having one or more substituents selected from the group consisting of a halogen atom, an alkyl group, and a mercapto group.

In another embodiment, the compound represented by formula (2) is one or more selected from the group consisting of alkanediol optionally having a substituent, cycloalkanediol optionally having a substituent, alkenediol optionally having a substituent, alkynediol optionally having a substituent, a hydrogenated bisphenol optionally having a substituent, polyalkylene glycol optionally having a substituent, dialkanolamine optionally having a substituent, and an aromatic diol having a hydroxyalkyl group bonded to an aromatic ring and optionally having a substituent.

Here, the number of carbon atoms in alkanediol is preferably 1 to 60, more preferably 1 to 40, further preferably 1 to 30, and even more preferably 1 to 20. The number of carbon atoms in cycloalkanediol is preferably 3 to 10 and more preferably 3 to 6. The number of carbon atoms in alkenediol and alkynediol is preferably 2 to 60, more preferably 2 to 40, further preferably 2 to 30, and even more preferably 2 to 20. The number of carbon atoms described above does not include the number of carbon atoms of the substituent.

"Hydrogenated bisphenol" refers to a compound obtained by hydrogenating a benzene ring of a bisphenol compound such as bisphenol A, bisphenol AP, bisphenol AF, bisphenol B, bisphenol BP, bisphenol C, bisphenol E, bisphenol F, bisphenol G, bisphenol S, bisphenol PH, bisphenol TMC, and bisphenol Z to form a saturated carbon ring (cyclohexane).

As the polyalkylene glycol, a polyalkylene glycol having addition mole number of oxyalkylene groups of preferably 2 to 5, more preferably 2 to 4, further preferably 2 or 3, and even more preferably 2 is suitable.

As the dialkanolamine, a dialkanolamine having two hydroxyalkyl groups each having preferably 1 to 10, more preferably 1 to 6, further preferably 1 to 4, and even more preferably 1 or 2 carbon atoms which are bonded to a nitrogen atom thereof is suitable. The number of carbon atoms described above does not include the number of carbon atoms of the substituent.

The aromatic diol is not particularly limited as long as it has a hydroxyalkyl group bonded to an aromatic ring. Among them, an aromatic diol having one or two hydroxyalkyl groups each having preferably 1 to 10 carbon atoms, more preferably 1 to 6 carbon atoms, further preferably 1 to 4 carbon atoms, and even more preferably 1 or 2 carbon atoms is suitable. The number of carbon atoms described above does not include the number of carbon atoms of the substituent.

In a preferable embodiment, the compound represented by formula (2) is one or more selected from the group consisting of compounds represented by formula (2-1) to formula (2-26) below:

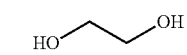 (2-1)

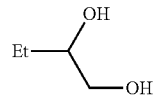 (2-2)

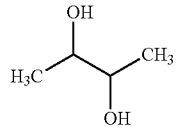 (2-3)

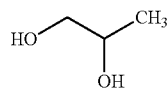 (2-4)

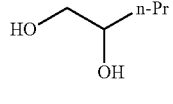 (2-5)

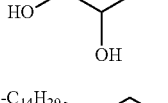 (2-6)

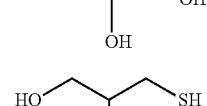 (2-7)

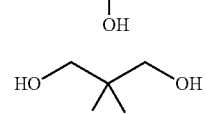 (2-8)

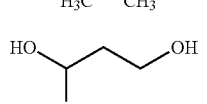 (2-9)

 (2-10)

-continued

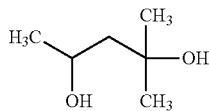 (2-11)

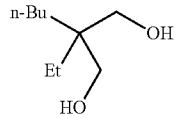 (2-12)

 (2-13)

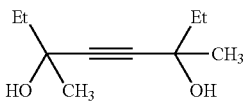 (2-14)

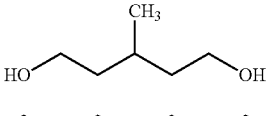 (2-15)

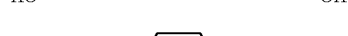 (2-16)

 (2-17)

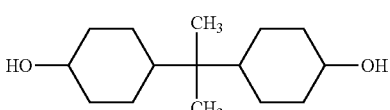 (2-18)

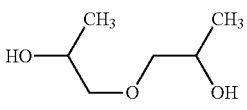 (2-19)

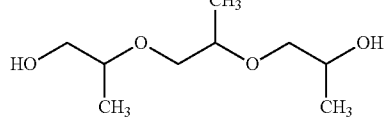 (2-20)

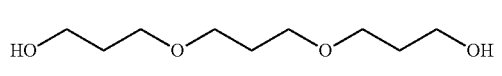 (2-21)

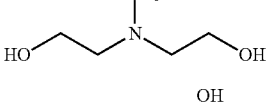 (2-22)

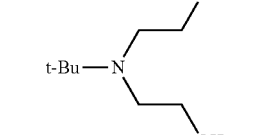 (2-23)

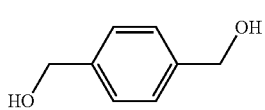 (2-24)

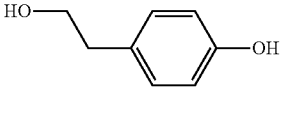 (2-25)

-continued

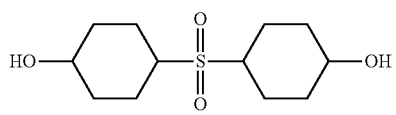
(2-26)

wherein Et represents an ethyl group, n-Pr represents an n-propyl group, n-Bu represents an n-butyl group, and t-Bu represents a tert-butyl group. The same applies hereinafter.

X, Y, Z and n in formula (2-1) to Formula (2-26) are as indicated in Table 2-1 to Table 2-3 below. In the tables, * indicates a bond.

TABLE 2-1

| | X | Y | Z | n | Compound name |
|---|---|---|---|---|---|
| (2-1) | *∕∖* | — | — | 0 | Ethylene glycol |
| (2-2) | Et—CH(*)—CH₂* | — | — | 0 | 1,2-Butanediol |
| (2-3) | H₃C—CH(*)—CH(*)—CH₃ | — | — | 0 | 2,3-Butanediol |
| (2-4) | *—CH₂—CH(*)—CH₃ | — | — | 0 | Propylene glycol |
| (2-5) | *—CH₂—CH(*)—n-Pr | — | — | 0 | 1,2-Pentanediol |
| (2-6) | *—CH₂—CH(*)—n-Bu | — | — | 0 | 1,2-Hexanediol |
| (2-7) | n-C₁₄H₂₉—CH(*)—CH₂—* | — | — | 0 | 1,2-Hexadecanediol |
| (2-8) | *—CH₂—CH(*)—SH | — | — | 0 | 1-Thioglycerol |
| (2-9) | *—CH₂—C(CH₃)(CH₃)—CH₂—* | — | — | 0 | 2,2-Dimethyl-1,3-propanediol |

TABLE 2-2

| | X | Y | Z | n | Compound name |
|---|---|---|---|---|---|
| (2-10) | *—CH(CH₃)—CH₂—CH₂—* | — | — | 0 | 1,3-Butanediol |
| (2-11) | H₃C—CH(*)—CH₂—C(CH₃)(CH₃)—* | — | — | 0 | Hexylene glycol |
| (2-12) | n-Bu—C(Et)(CH₂*)—CH₂—* | — | — | 0 | 2-Butyl-2-ethyl-1,3-propanediol |
| (2-13) | *—CH₂—CH₂—CH₂—CH₂—* | — | — | 0 | 1,4-Butanediol |
| (2-14) | *—C(Et)(CH₃)—C≡C—C(Et)(CH₃)—* | — | — | 0 | 3,6-Dimethyl-4-octyne-3,6-diol |
| (2-15) | *—CH₂—CH₂—CH(CH₃)—CH₂—CH₂—* | — | — | 0 | 3-Methyl-1,5-pentanediol |
| (2-16) | *—(CH₂)₇—* | — | — | 0 | 1,7-Heptanediol |
| (2-17) | *—C₆H₁₀—* (1,4-cyclohexylene) | — | — | 0 | 1,4-Cyclohexanediol |

TABLE 2-2-continued

| | X | Y | Z | n | Compound name |
|---|---|---|---|---|---|
| (2-18) |  | 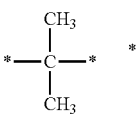 | 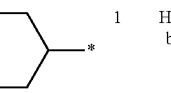 | 1 | Hydrogenated bisphenol A |

TABLE 2-3

| | X | Y | Z | n | Compound name |
|---|---|---|---|---|---|
| (2-19) | 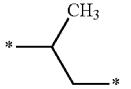 | 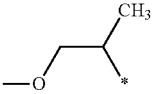 | Single bond | 1 | Dipropylene glycol |
| (2-20) | 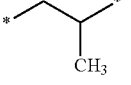 | 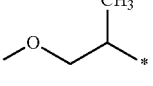 | Single bond | 2 | Triisopropylene glycol |
| (2-21) | 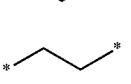 | 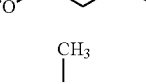 | Single bond | 2 | Tripropylene glycol |
| (2-22) | 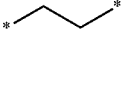 | 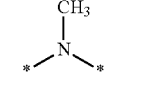 | 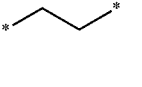 | 1 | N-methyl diethanolamine |
| (2-23) |  | 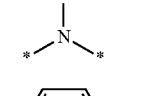 |  | 1 | N-tert-butyl-diethanolamine |
| (2-24) | 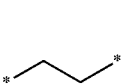 | 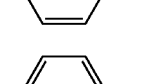 | 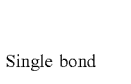 | 1 | p-Xylene glycol |
| (2-25) | 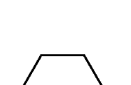 | 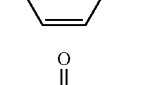 | Single bond | 1 | p-Hydroxy phenethyl alcohol |
| (2-26) | 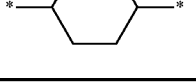 | 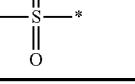 | 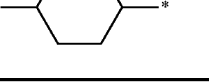 | 1 | Hydrogenated bisphenol S |

The compound represented by formula (2) may be used singly or in combination of two or more thereof.

In a preferable embodiment, the compound represented by formula (2) is the compound represented by formula (2-1), formula (2-10), formula (2-13), formula (2-16), formula (2-17), formula (2-19), formula (2-20), formula (2-22), formula (2-24), or formula (2-25) above.

The polyester compound of the present invention may be produced using other compounds, as a raw material, in addition to the compound represented by formula (1) and the compound represented by formula (2) as long as the effect of the present invention is not impaired.

Examples of other compounds include aromatic dicarboxylic acids, a salt thereof, an ester thereof, and a halide thereof. Therefore, in a preferable embodiment, the polyester compound of the present invention can be obtained by reaction of the compound represented by formula (1), the compound represented by formula (2), and one or more compounds elected from the group consisting of aromatic dicarboxylic acid, a salt thereof, an ester thereof, and a halide thereof.

The number of carbon atoms in the aromatic dicarboxylic acid that may be used for producing the polyester compound of the present invention is preferably 8 to 18, more preferably 8 to 16, and further preferably 8 to 14. Examples of the salt of aromatic dicarboxylic acid include alkaline metal salts. Among them, lithium salts, sodium salts, potassium salts, and cesium salts are preferable, and potassium salts are more preferable. Examples of the ester of aromatic dicarboxylic acid include a $C_1$-$C_{10}$ alkyl ester (preferably a $C_1$-$C_6$ alkyl ester and more preferably a $C_1$-$C_4$ alkyl ester) and a $C_6$-$C_{18}$ aryl ester (preferably a $C_6$-$C_{14}$ aryl ester and more preferably a $C_6$-$C_{10}$ aryl ester). Examples of the halide of aromatic dicarboxylic acid include fluorides, chlorides, bromides, and iodides, and chlorides are preferable.

Examples of an aromatic dicarboxylic acid, a salt thereof, an ester thereof, and a halide thereof that may be used for producing the polyester compound of the present invention include terephthalic acid, isophthalic acid, 2,6-naphthalenedicarboxylic acid, 4,4'-biphenyldicarboxylic acid, 4,4'-dicarboxydiphenyl ether, 4,4'-dicarboxydiphenylsulfone, terephthalic acid dipotassium salt, isophthalic acid dipotassium salt, terephthalic acid dimethyl ester, isophthalic acid dimethyl ester, terephthalic acid dichloride, and isophthalic acid dichloride. Among them, terephthalic acid, isophthalic acid, and 2,6-naphthalenedicarboxylic acid are preferable.

The polyester compound of the present invention includes one or more selected from the group consisting of structural units represented by Formulae (i) to (iv):

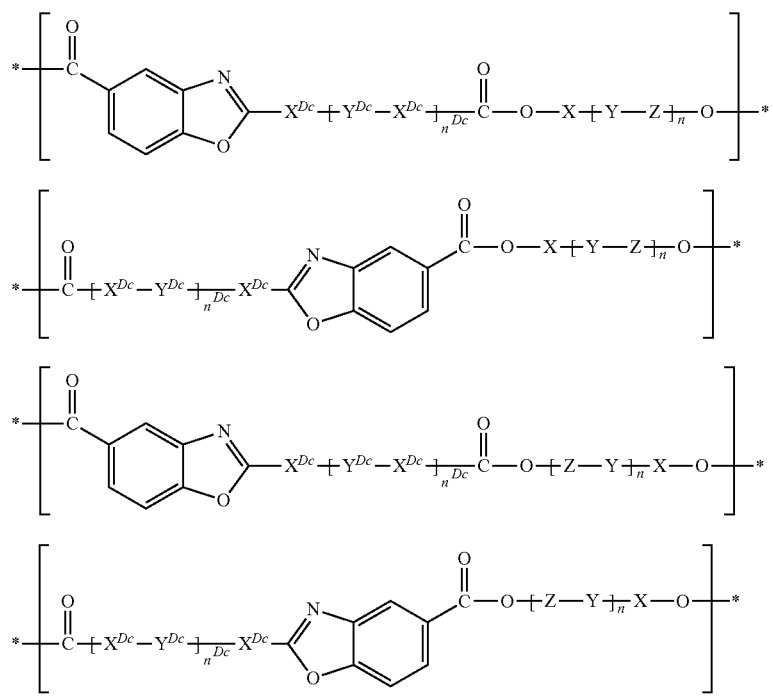

wherein $X^{Dc}$, $Y^{Dc}$, X, Y, Z, $n^{Dc}$, and n represent the same meanings as defined above, and * represents a bond.

Preferable examples of $X^{Dc}$, $Y^{Dc}$, x, Y and Z as well as preferable ranges of $n^{Dc}$ and n are as previously mentioned.

When the polyester compound of the present invention is produced using other compounds, as a raw material, in addition to the compound represented by formula (1) and the compound represented by formula (2), the polyester compound of the present invention may further include a structural unit derived from the other compounds. For example, when the aromatic dicarboxylic acid above is used as the other compounds, the polyester compound of the present invention may further include one or more selected from the group consisting of structural units represented by formulae (v) and (vi):

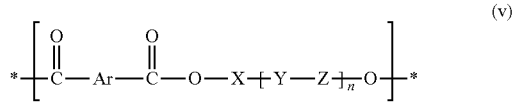

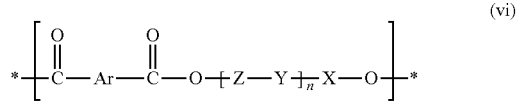

wherein X, Y, Z and n represent the same meaning as defined above, Ar represents an arylene group, and * represents a bond.

In formulae (v) and (vi), the arylene group represented by Ar represents an arylene group derived from the aromatic dicarboxylic acid used as the "other compound". The number of carbon atoms in the arylene group represented by Ar is preferably 6 to 18, more preferably 6 to 14, and further preferably 6 to 10. Preferable specific examples of the arylene group represented by Ar include a 1,4-phenylene group, a 1,3-phenylene group, and a 2,6-naphthalylene group.

When producing the polyester compound of the present invention, the ratio of the amount (mole) of the other compounds to the total amount (mole) of the compound represented by formula (1) and the compound represented by formula (2), that is, the molar ratio of [other compounds]/([compound represented by formula (1)]+[compound represented by formula (2)]) is preferably 0.5 or less, more preferably 0.3 or less, further preferably 0.2 or less, and even more preferably 0.1 or less, in view of obtaining a polyester compound with high thermal resistance. The lower limit of the molar ratio is not particularly limited and may be 0.

When the aromatic dicarboxylic acid is used as the other compounds, the ratio of the amount (mole) of the compound represented by formula (2) to the total amount (mole) of the compound represented by formula (1) and the aromatic dicarboxylic acid, that is, the molar ratio of [compound represented by formula (2)]/([compound represented by formula (1)]+[aromatic dicarboxylic acid]) is preferably 0.9 to 1.1 and more preferably 0.95 to 1.05.

The reaction of the compound represented by formula (1) and the compound represented by formula (2) and, if necessary, other compounds may be conducted in the presence of a condensation agent. The condensation agent is not particularly limited as long as it promotes an esterification reaction or a transesterification reaction. Examples of the condensation agent include chlorodiphenyl phosphate, tosyl chloride, triphenylphosphine dichloride, thionyl chloride, picryl chloride, hexachlorocyclotriphosphazene, phosphorus trichloride, and triphenyl phosphite. The condensation agent may be used singly or in combination of two or more thereof.

The reaction of the compound represented by formula (1) and the compound represented by formula (2) and, if necessary, other compounds may be conducted in the presence of a catalyst. The catalyst is not particularly limited as long as it promotes an esterification reaction or a transesterification reaction. Examples of the catalyst include oxides or salts of metals such as lead, zinc, manganese, calcium, cobalt, magnesium, and titanium. The catalyst may be used singly or in combination of two or more thereof.

The condensation agent and the catalyst may be used in combination. In such a case, each may be used singly (that is, a combination of one condensation agent and one catalyst), or two or more of each may be used in combination (that is, a combination of two or more condensation agents and two or more catalysts).

The reaction may be conducted in an organic solvent. Examples of the organic solvent include pyridine, N,N-dimethylformamide, N-methyl-2-pyrrolidone, carbon tetrachloride, hexachloroethane, 1,2-dichloroethane, chlorobenzene, and o-dichlorobenzene. The organic solvent may be used singly or in combination of two or more thereof.

In the case of a solution polymerization process in which an esterification reaction or a transesterification reaction is conducted in an organic solvent for polycondensation, the reaction is preferably conducted in an inert gas atmosphere such as argon and nitrogen and preferably conducted under atmospheric pressure (normal pressure).

In the case of a melt polymerization process in which an esterification reaction or a transesterification reaction is conducted using a molten raw material for polycondensation without using an organic solvent, the reaction is preferably conducted under an inert gas atmosphere such as argon and nitrogen and preferably conducted under a reduced pressure. The pressure is not particularly limited as long as an esterification reaction or a transesterification reaction proceeds. The pressure is preferably 750 Torr or lower, more preferably 300 Torr or lower, and further preferably 50 Torr or lower. Although the lower limit of the pressure is not particularly limited, it is usually 0.1 Torr or higher.

The reaction temperature is not particularly limited as long as an esterification reaction or a transesterification reaction proceeds. In a solution polymerization process, the reaction temperature is preferably −10 to 200° C., more preferably 0 to 150° C., further preferably 20 to 120° C., and even more preferably 20 to 100° C. In a melt polymerization process, the reaction temperature is preferably 100 to 400° C., more preferably 150 to 350° C., and further preferably 150 to 300° C.

The reaction time varies depending on the kind of the raw material, the reaction temperature, and other factors, and it is preferably 0.1 to 24 hours, more preferably 0.5 to 18 hours, and further preferably 1 to 12 hours.

The extrapolated onset temperature as glass transition temperature ($T_{ig}$) of the polyester compound of the present invention is preferably 70° C. or higher and more preferably 80° C. or higher. The polyester compound of the present invention obtained by reaction of the compound represented by Formula (1) with the compound represented by Formula (2) achieves a high $T_{ig}$, for example, $T_{ig}$ of 90° C. or higher, 100° C. or higher, 110° C. or higher, 120° C. or higher, 130° C. or higher, 140° C. or higher, 150° C. or higher, 160° C. or higher, 170° C. or higher, 180° C. or higher, or 190° C. or higher. Although the upper limit of $T_{ig}$ is not particularly limited, it is usually 300° C. or lower, 285° C. or lower, 270° C. or lower, 255° C. or lower, 240° C. or lower, 225° C. or lower, or 210° C. or lower.

$T_{ig}$ can be measured, for example, using a differential scanning calorimeter.

The intermediate glass transition point ($T_{mg}$) of the polyester compound of the present invention is preferably 80° C. or higher and more preferably 90° C. or higher. The polyester compound of the present invention obtained by reaction of the compound represented by Formula (1) with the compound represented by Formula (2) achieves a high $T_{mg}$, for example, $T_{mg}$ of 100° C. or higher, 110° C. or higher, 120° C. or higher, 130° C. or higher, 140° C. or higher, 150° C. or higher, 160° C. or higher, 170° C. or higher, 180° C. or higher, or 190° C. or higher. Although the upper limit of $T_{mg}$ is not particularly limited, it is usually, for example, 300° C. or lower, 285° C. or lower, 270° C. or lower, 255° C. or lower, 240° C. or lower, 225° C. or lower, or 210° C. or lower.

$T_{mg}$ can be measured, for example, using a differential scanning calorimeter.

The melting point ($T_m$) of the polyester compound of the present invention is preferably 140° C. or higher and more preferably 180° C. or higher. The polyester compound of the present invention obtained by reaction of the compound represented by Formula (1) with the compound represented by Formula (2) achieves a high $T_m$, for example, $T_m$ of 200° C. or higher, 220° C. or higher, 240° C. or higher, 260° C. or higher, 280° C. or higher, or 300° C. or higher. Although the upper limit of $T_m$ is not particularly limited, it is usually, for example, 500° C. or lower, 470° C. or lower, 440° C. or lower, 410° C. or lower, 380° C. or lower, 350° C. or lower, or 320° C. or lower.

$T_m$ can be measured, for example, using a differential scanning calorimeter.

The 5% mass reduction temperature ($T_d$; the temperature at a point of time when the mass of the polyester compound is reduced by 5% when the polyester compound is heated from room temperature at a certain rate of temperature increase) of the polyester compound of the present invention is preferably 250° C. or higher and more preferably 270° C. or higher. The polyester compound of the present invention obtained by reaction of the compound represented by Formula (1) with the compound represented by Formula (2) achieves a high $T_d$, for example, $T_d$ of 280° C. or higher, 290° C. or higher, 300° C. or higher, 310° C. or higher, 320° C. or higher, 330° C. or higher, or 340° C. or higher. Although the upper limit of $T_d$ is not particularly limited, it is usually, for example, 500° C. or lower, 470° C. or lower, 440° C. or lower, 410° C. or lower, 380° C. or lower, or 350° C. or lower.

$T_d$ can be measured, for example, using a thermogravimetric apparatus.

The polyester compound according to the present invention has high thermal resistance and therefore can be suitably used in, for example, packaging materials (for example, bags, films, tubes), magnetic tapes, food containers, clothing fibers, cushioning materials, insulating materials, electric and electronic materials (for example, solar cells, dry photoresists, flat panel displays, touch panels), and other fields. For example, the polyester compound of the present invention can be used as a substitute for conventional polyethylene terephthalate (PET) and polybutylene terephthalate (PBT).

Method of Producing the Polyester Compound.

The present invention also provides a method of producing a polyester compound.

In a preferable embodiment, a method of producing a polyester compound of the present invention includes the step of conducting reaction of the compound represented by formula (1) with the compound represented by formula (2).

The compound represented by formula (1), the compound represented by formula (2), and the reaction conditions (including catalyst, organic solvent, molar ratio, reaction temperature, reaction pressure, and reaction time) are as previously mentioned.

In producing the polyester compound of the present invention, the ratio in amount (mole) between the compound represented by formula (1) and the compound represented by formula (2), that is, the molar ratio of [compound represented by formula (1)]/[compound represented by formula (2)] is 10/1 to 1/10 in view of obtaining a polyester compound with high thermal resistance. The molar ratio of [compound represented by formula (1)]/[compound represented by formula (2)] is preferably 3/1 to 1/3, more preferably 1.5/1 to 1/1.5, and further preferably 1/1.

In the method of producing a polyester compound of the present invention, a polyester compound may be produced using other compounds, as a raw material, in addition to the compound represented by formula (1) and the compound represented by formula (2) as long as the effect of the present invention is not impaired. Examples of the other compounds include aromatic dicarboxylic acid, a salt thereof, an ester thereof, and a halide thereof.

In a preferable embodiment, the method of producing a polyester compound of the present invention includes the step of conducting reaction of the compound represented by formula (1), the compound represented by formula (2), and one or more selected from the group consisting of aromatic dicarboxylic acid, a salt thereof, an ester thereof, and a halide thereof.

The aromatic dicarboxylic acid, the salt thereof, the ester thereof, and the halide thereof are as previously mentioned.

When a polyester compound is produced by reaction of the compound represented by formula (1) and the compound represented by formula (2) and, if necessary, other compounds, a solution polymerization process may be used in which an esterification reaction or a transesterification reaction is conducted in an organic solvent for polycondensation, or a melt polymerization process may be used in which an esterification reaction or a transesterification reaction is conducted using a molten raw material for polycondensation without using an organic solvent. Alternatively, a polyester compound may be produced using an interfacial polymerization process. The procedures and conditions of these polymerization processes are well known in the art.

Other features of the invention will become apparent in the course of the following descriptions of exemplary embodiments which are given for illustration of the invention and are not intended to be limiting thereof.

EXAMPLES

The temperatures are indicated in centigrade unless otherwise specified. The abbreviations used in Examples include:

N,N-dimethylformamide: DMF,
N-methyl-2-pyrrolidone: NMP,
tetrahydrofuran: THF,
triethylamine: TEA,
2-(4-carboxyphenyl)benzo[d]oxazole-5-carboxylic acid: 4CBOC,
2-(3-carboxyphenyl)benzo[d]oxazole-5-carboxylic acid: 3CBOC, and
ethylene glycol: EG.

The structures of the synthesized compounds were identified by proton nuclear magnetic resonance ($^1$H-NMR) spectra using a nuclear magnetic resonance apparatus ("AVANCE400" (400 MHz) manufactured by Bruker Corporation). The chemical shift (δ) is indicated in ppm.

Synthesis Example 1

Synthesis of 2-(4-carboxyphenyl)benzo[d]oxazole-5-carboxylic acid (4CBOC)

4CBOC was synthesized in accordance with the procedures (1) to (4) below.

(1) Synthesis of 3-amino-4-hydroxybenzoic acid methyl ester hydrochloride

Into 250 mL of methanol, 32.0 g (407 mmol) of acetyl chloride was added dropwise under ice cooling. After stirring at room temperature for 30 minutes, 27.9 g of 3-amino-4-hydroxybenzoic acid (182 mmol) was added and dissolved therein, followed by heating and stirring at 80° C. for 4 hours. After being cooled to room temperature, the solution was condensed, and the resultant residue was washed with 250 mL of ethyl acetate and cooled to 0° C., followed by filtration and separation to yield a white solid. This solid was dried overnight at 50° C. under a reduced pressure, thus obtaining 30.7 g (151 mmol) of the titled compound (yield 83%).

1H-NMR (400 MHz, DMSO-d6) δ: 3.81 (3H, s), 7.14 (1H, d, J=8.52 Hz), 7.78 (1H, dd, J=8.52, 2.12 Hz), 7.92 (1H, d, J=2.12 Hz).

(2) Synthesis of 2-hydroxy-5-methoxycarbonyl-N-(4-methoxycarbonylbenzylidene)-aniline Into 300 mL of methanol, 30.7 g (151 mmol) of 3-amino-4-hydroxybenzoic acid methyl ester hydrochloride was dissolved and 15.6 g (154 mmol) of triethyl amine was added dropwise. Thereafter, 24.8 g (151 mmol) of terephthalaldehydic acid methyl ester was added therein and the resultant was stirred at room temperature for 3 hours, followed by condensation and drying to yield a yellow solid. This solid was dried overnight at 50° C. under a reduced pressure, thus obtaining 47.2 g (151 mmol) of the titled compound (yield 100%).

1H-NMR (400 MHz, CDCl3) δ: 3.92 (3H, s), 3.97 (3H, s), 7.06 (1H, d, J=8.5 Hz), 7.59 (1H, br), 7.95 (1H, dd, J=8.52, 1.96 Hz), 8.00-8.02 (2H, m), 8.07 (1H, d, J=1.96 Hz), 8.16-8.18 (2H, m), 8.86 (1H, s).

(3) Synthesis of 2-[4-(methoxycarbonyl)phenyl]benzo[d]oxazole-5-carboxylic acid methyl ester Into 500 mL of dichloromethane, 47.2 g (151 mmol) of 2-hydroxy-5-methoxycarbonyl-N-(4-methoxycarbonylbenzylidene)aniline was dissolved and cooled to 0° C., and then 34.3 g (151 mmol) of 2,3-dichloro-5,6-dicyano-p-benzoquinone was added therein and the resultant was stirred at 0° C. for 1 hour. A brown solid obtained by condensation and drying was washed with 1 L of an aqueous solution of 5 wt % potassium carbonate and filtered to yield a brown solid. This solid was washed using 100 mL of toluene and filtered to yield a pale brown solid. This solid was dried overnight at 50° C. under a reduced pressure, thus obtaining 40.8 g (131 mmol) of the titled compound (yield 87%).

1H-NMR (400 MHz, CDCl3) δ: 3.92 (3H, s), 3.97 (3H, s), 7.65 (1H, d, J=9.12 Hz), 8.15 dd, J=8.56, 1.64 Hz), 8.20-8.22 (2H, m), 8.34-8.36 (2H, m), 8.50 (1H, m).

(4) Synthesis of 4CBOC

Into 100 mL of a solution of 1,4-dioxane/water=1/1, 10.0 g (32.1 mmol) of 2-[4-(methoxycarbonyl)phenyl]benzo[d]oxazole-5-carboxylic acid methyl ester was dissolved, and 3.37 g (80.3 mmol) of lithium hydroxide monohydrate was added thereto, and the resultant was heated and stirred at 50° C. for 1 hour. After being cooled to room temperature, the solution was condensed, and the resultant residue was dissolved in 150 mL of water and neutralized with concentrated hydrochloric acid to pH 3.0. The solid obtained by filtering the product was washed with 100 mL of methanol to yield a pale brown solid. This solid was dried overnight at 50° C. under a reduced pressure, thus obtaining 8.18 g (28.9 mmol) of the titled compound having the structural formula below (yield 90%).

1H-NMR (400 MHz, CDCl3) δ: 7.94 (1H, d, J=8.96 Hz), 8.09 (1H, dd, J=8.52, 1.68 Hz), 8.16-8.18 (2H, m), 8.34-8.36 (3H, m).

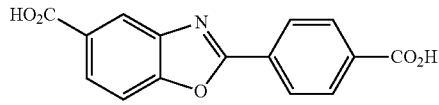 [SMILES: O=C(O)c1ccc(-c2nc3cc(C(=O)O)ccc3o2)cc1]

Synthesis Example 2

Synthesis of 2-(3-carboxyphenyl)benzo[d]oxazole-5-carboxylic acid (3CBOC)

The same operation as in Synthesis Example 1 was performed except that isophthalaldehydic acid methyl ester was used instead of terephthalaldehydic acid methyl ester, thus obtaining 8.96 g (31.6 mmol) of the titled compound having the structure below (total yield: 71.5%).

1H-NMR (400 MHz, DMSO-d6) δ: 8.75 (1H, t, J=1.68 Hz), 8.46 (1H, dt, J=8.16, 1.24 Hz), 8.35 (1H, d, J=1.44 Hz), 8.20 (1H, dt, J=7.92, 1.24 Hz), 8.08 (1H, dd, J=8.52, 1.64 Hz), 7.94 (1H, d, J=8.60 Hz), 7.79 (1H, t, J=7.80 Hz).

[Chem. 19]

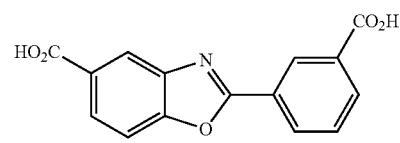

Example 1

Synthesis of Polyester Using 4CBOC and Ethylene Glycol (EG) as Monomers

Into 20 mL of pyridine, 1.89 mL (9.18 mmol) of chlorodiphenyl phosphate was dissolved, and 0.164 mL (2.12 mmol) of DMF was added, followed by stirred at room temperature for 30 minutes. Next, 1.00 g (3.53 mmol) of 4CBOC was added therein and the resultant was stirred at room temperature for 10 minutes. With the temperature increased to 120° C., 0.219 g (3.53 mmol) of EG was added, followed by stirring at 120° C. for 12 hours. EG has the structure below. The reaction mixture was cooled to room temperature and then put into a ten-fold volume of methanol and filtered to yield a pale brown solid. This solid was washed using 100 mL of boiled methanol and filtered to yield a pale brown solid. This solid was dried overnight at 50° C. under a reduced pressure, thus obtaining 1.03 g of the objective polyester compound (yield 94%).

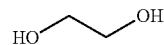

The resultant polyester compounds were evaluated with regard to (1) and (2) below. The results are listed in Table 3.

(1) Measurement of the Extrapolated Onset Temperature as Glass Transition Temperature $T_{ig}$, the Intermediate Glass Transition Point $T_{mg}$, and the Melting Point $T_m$ $T_{ig}$, $T_{mg}$, $T_m$ were measured using a differential scanning calorimeter ("DSC6200" manufactured by Seiko Instruments Inc.). The temperature was increased from 25° C. to 420° C. at a rate of temperature increase of 10° C./minute. The extrapolated glass transition onset temperature $T_{ig}$ was obtained from the temperature at the point of intersection between a straight line extended from the base line on the low-temperature side toward the high temperature side in the DSC thermogram and a tangent line at a point that the gradient of the curve of stepwise changes of glass transition is largest. The intermediate glass transition temperature $T_{mg}$ (° C.) was obtained from the temperature at the point of inflection in the DSC thermogram (the peak top of the differential curve of the DSC thermogram). The melting point $T_m$ (° C.) was obtained from the top of the endothermic peak of the DSC thermogram.

(2) Measurement of 5% Mass Reduction Temperature $T_d$ $T_d$ was measured using a thermogravimetric apparatus ("TG/DTA6200" manufactured by Seiko Instruments Inc.). In the furnace under a nitrogen atmosphere, heating was conducted from room temperature to 550° C. at a rate of temperature increase of 10° C./minute. The temperature $T_d$ (° C.) at which the mass was reduced by 5% was obtained from the resultant thermogravimetric curve.

Examples and a reference example below were evaluated similarly. The results thereof are listed in Table 3.

Example 2

Synthesis of Polyester Using 4CBOC and 1,4-Butanediol as Monomers

The same operation as in Example 1 was performed except that 1,4-butanediol having the structure below was used instead of EG, thus obtaining 0.69 g of the objective polyester compound (pale brown) (yield 58%).

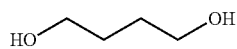

Example 3

Synthesis of Polyester Using 4CBOC and 1,7-Heptanediol as Monomers

The same operation as in Example 1 was performed except that 1,7-heptanediol having the structure below was used instead of EG, thus obtaining 0.53 g of the objective polyester compound (pale brown) (yield 39%).

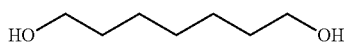

Example 4

Synthesis of Polyester Using 4CBOC and p-Xylene Glycol as Monomers

The same operation as in Example 1 was performed except that p-xylene glycol having the structure below was used instead of EG, thus obtaining 1.02 g of the objective polyester compound (pale brown) (yield 75%).

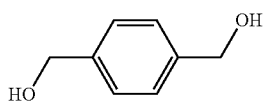

Example 5

Synthesis of Polyester Using 4CBOC and p-Hydroxyphenethyl Alcohol as Monomers The same operation as in Example 1 was performed except that p-hydroxyphenethyl alcohol having the structure below was used instead of EG, thus obtaining 0.56 g of the objective polyester compound (pale brown) (yield 46%).

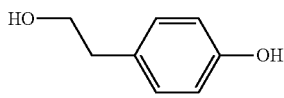

Example 6

Synthesis of Polyester Using 4CBOC and 1,3-Butanediol as Monomers

The same operation as in Example 1 was performed except that 1,3-butanediol having the structure below was used instead of EG, thus obtaining 0.44 g of the objective polyester compound (pale brown) (yield 37%).

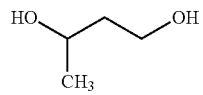

Example 7

Synthesis of Polyester Using 4CBOC and N-Methyldiethanolamine as Monomers

The same operation as in Example 1 was performed except that N-methyldiethanolamine having the structure below was used instead of EG, thus obtaining 0.57 g of the objective polyester compound (pale brown) (yield 48%).

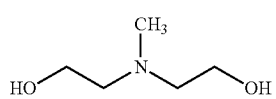

Example 8

Synthesis of Polyester Using 4CBOC and Tripropylene Glycol as Monomers

The same operation as in Example 1 was performed except that tripropylene glycol having the structure below was used instead of EG, thus obtaining 0.16 g of the objective polyester compound (pale brown) (yield 10%).

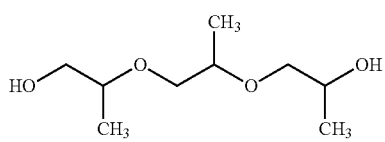

Example 9

Synthesis of Polyester Using 4CBOC and Dipropylene Glycol as Monomers

The same operation as in Example 1 was performed except that dipropylene glycol having the structure below was used instead of EG, thus obtaining 0.22 g of the objective polyester compound (pale brown) (yield 16%).

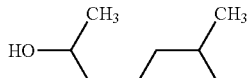

Example 10

Synthesis of Polyester Using 4CBOC and 1,4-Cyclohexanediol as Monomers

The same operation as in Example 1 was performed except that 1,4-cyclohexanediol having the structure below was used instead of EG, thus obtaining 1.24 g of the objective aromatic polyester (pale brown) (yield 97%). The 1,4-cyclohexanediol used is a mixture of cis and trans isomers.

Example 11

Synthesis of Polyester Using 3CBOC and EG as Monomers

The same operation as in Example 1 was performed except that 3CBOC was used instead of 4CBOC, thus obtaining 1.24 g of the objective aromatic polyester (pale brown) (yield 83%).

Reference Example 1

Synthesis of Polyester Using Terephthalic Acid and EG as Monomers

Into 10 mL of NMP, 1.02 g (5.00 mmol) of terephthalic acid chloride was dissolved, and 0.808 mL (10.0 mmol) of pyridine was added. Thereafter, 0.310 g (5.00 mmol) of EG dissolved in 5 mL of NMP was added therein and the resultant was stirred at room temperature for 1 hour. The reaction mixture was put into a ten-fold volume of methanol and filtered to yield a white solid. This solid was washed with 100 mL of methanol and filtered to yield a white solid. This solid was dried overnight at 50° C. under a reduced pressure, thus obtaining 0.85 g of a polyester compound (yield 88%).

Reference Example 2

Synthesis of Polyester Using Terephthalic Acid and 1,4-Butanediol as Monomers The same operation as in Reference Example 1 was performed except that 1,4-butanediol was used instead of EG, thus obtaining 0.97 g of a polyester compound (white) (yield 98%).

Reference Example 3

Synthesis of Polyester Using Terephthalic Acid and 1,7-Heptanediol as Monomers The same operation as in Reference Example 1 was performed except that 1,7-heptanediol was used instead of EG, thus obtaining 1.18 g of a polyester compound (white) (yield 89%).

Reference Example 4

Synthesis of Polyester Using Terephthalic Acid and p-Xylene Glycol as Monomers The same operation as in Reference Example 1 was performed except that p-xylene glycol was used instead of EG, thus obtaining 1.31 g of a polyester compound (white) (yield 99%).

Reference Example 5

Synthesis of Polyester Using Terephthalic Acid and p-Hydroxyphenethyl Alcohol as Monomers The same operation as in Reference Example 1 was performed except that p-hydroxyphenethyl alcohol was used instead of EG, thus obtaining 1.23 g of a polyester compound (white) (yield 93%).

Reference Example 6

Synthesis of Polyester Using Terephthalic Acid and 1,3-Butanediol as Monomers The same operation as in Reference Example 1 was performed except that 1,3-butanediol was used instead of EG, thus obtaining 0.82 g of a polyester compound (white) (yield 75%).

Reference Example 7

Synthesis of Polyester Using Terephthalic Acid and N-Methyldiethanolamine as Monomers The same operation as in Reference Example 1 was performed except that N-methyldiethanolamine was used instead of EG, thus obtaining 1.14 g of a polyester compound (white) (yield 91%).

Reference Example 8

Synthesis of Polyester Using Terephthalic Acid and Tripropylene Glycol as Monomers The same operation as in Reference Example 1 was performed except that tripropylene glycol was used instead of EG, thus obtaining 0.85 g of a polyester compound (white) (yield 53%).

Reference Example 9

Synthesis of Polyester Using Terephthalic Acid and Dipropylene Glycol as Monomers The same operation as in Reference Example 1 was performed except that dipropylene glycol was used instead of EG, thus obtaining 0.66 g of a polyester compound (white) (yield 50%).

Reference Example 10

Synthesis of Polyester Using Terephthalic Acid and 1,4-Cyclohexanediol (Cis/Trans Mixture) as Monomers The same operation as in Reference Example 1 was performed except that 1,4-cyclohexanediol was used instead of EG, thus obtaining 1.11 g of a polyester compound (white) (yield 90%). The 1,4-cyclohexanediol used is a mixture of cis and trans isomers.

TABLE 3

|  |  | Dicarboxylic acid monomer | Diol monomer | $T_{ig}$ (° C.) | $T_{mg}$ (° C.) | $T_m$ (° C.) | $T_d$ (° C.) |
|---|---|---|---|---|---|---|---|
| Examples | 1 | 4CBOC | EG | 170 | 177 | 301 | 343 |
|  | 2 | 4CBOC | 1,4-Butanediol | 117 | 137 | 238 | 271 |
|  | 3 | 4CBOC | 1,7-Heptanediol | 107 | 111 | 148 | 274 |
|  | 4 | 4CBOC | p-Xylene glycol | 194 | 200 | 317 | 344 |
|  | 5 | 4CBOC | p-Hydroxyphenethyl alcohol | 147 | 157 | 223 | 254 |
|  | 6 | 4CBOC | 1,3-Butanediol | 112 | 127 | 231 | 294 |
|  | 7 | 4CBOC | N-methyldiethanolamine | 104 | 112 | 192 | 265 |
|  | 8 | 4CBOC | Tripropylene glycol | N.D. | N.D. | 256 | 326 |
|  | 9 | 4CBOC | Dipropylene glycol | N.D. | N.D. | 225 | 333 |
|  | 10 | 4CBOC | 1,4-Cyclohexanediol | 110 | 113 | 224 | 265 |
|  | 11 | 3CBOC | EG | 91 | 95 | N.D. | 335 |
| Reference Examples | 1 | Terephthalic acid | EG | 73 | 76 | 255 | 300 |
|  | 2 | Terephthalic acid | 1,4-Butanediol | N.D. | N.D. | 221 | 375 |
|  | 3 | Terephthalic acid | 1,7-Heptanediol | 65 | 66 | 95 | 376 |
|  | 4 | Terephthalic acid | p-Xylene glycol | N.D. | N.D. | 267 | 381 |
|  | 5 | Terephthalic acid | p-Hydroxyphenethyl alcohol | 127 | 132 | 322 | 384 |
|  | 6 | Terephthalic acid | 1,3-Butanediol | N.D. | N.D. | 56 | 323 |
|  | 7 | Terephthalic acid | N-methyldiethanolamine | N.D. | N.D. | 120 | 342 |
|  | 8 | Terephthalic acid | Tripropylene glycol | N.D. | N.D. | 95 | 305 |
|  | 9 | Terephthalic acid | Dipropylene glycol | N.D. | N.D. | 217 | 342 |
|  | 10 | Terephthalic acid | 1,4-Cyclohexanediol | 140 | 151 | 225 | 320 |

As indicated in Table 3, when the compound represented by formula (1) was used as a dicarboxylic acid monomer in place of conventional terephthalic acid, $T_{ig}$ and $T_{mg}$ of the resulting polyester compounds were increased to a large extent (with the comparison of Example 1 and Example 11 with Reference Example 1). By using the compound represented by formula (1) as a dicarboxylic acid monomer, polyester compounds with high thermal resistance were obtained even when using a variety of diol monomers as well as EG (Example 2 to 10).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:
1. A polyester compound produced by reacting:
(1) a compound represented by formula (1):

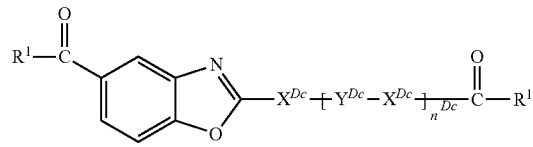

wherein
$R^1$ is a hydroxy group, a halogen atom, an alkoxy group, a cycloalkyloxy group, an aryloxy group, a group —OM, or a group —O—Si($R^2$)$_3$, where M is a metal atom and $R^2$ is an alkyl group;
$X^{Dc}$ is a divalent aromatic group optionally having a substituent;
$Y^{Dc}$ is —O—, —N=N—, a carbonyl group, an alkenylene group optionally having a substituent, or a single bond;
$n^{Dc}$ is an integer of 0 to 2;
the two $R^1$ may be the same as or different from each other;
when there are a plurality of $X^{Dc}$, they may be the same as or different from each other; and
when there are a plurality of $Y^{Dc}$, they may be the same as or different from each other, with
(2) a compound represented by formula (2):

$$R^4O-X-\!\!\left[Y-Z\right]_{\!n}\!\!-OR^4 \qquad (2)$$

wherein
$R^4$ is a hydrogen atom, an acyl group, or a group —Si($R^5$)$_3$, where $R^5$ is an alkyl group;
X is a divalent aliphatic hydrocarbon group optionally having a substituent;
Y is an imino group optionally having a substituent, a divalent aromatic group optionally having a substituent, an oxyalkylene group optionally having a substituent, a group —S(=O)$_2$—, or an alkylene group optionally having a substituent;
Z is a divalent aliphatic hydrocarbon group optionally having a substituent or a single bond;
n is an integer of 0 to 5;
the two $R^4$ may be the same as or different from each other;
when there are a plurality of Y, they may be the same as or different from each other; and
when there are a plurality of Z, they may be the same as or different from each other.

2. A polyester compound according to claim 1, wherein $X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent.

3. A polyester compound according to claim 1, wherein X is an alkylene group optionally having a substituent, a cycloalkylene group optionally having a substituent, an alkenylene group optionally having a substituent, or an alkynylene group optionally having a substituent.

4. A polyester compound according to claim 1, wherein Z is an alkylene group optionally having a substituent or a single bond.

5. A polyester compound according to claim 1, wherein said compound represented by formula (2) is one or more compounds selected from the group consisting of an alkanediol optionally having a substituent, cycloalkanediol optionally having a substituent, alkenediol optionally having a substituent, alkynediol optionally having a substituent, a hydrogenated bisphenol optionally having a substituent, polyalkylene glycol optionally having a substituent, dialkanolamine optionally having a substituent, and an aromatic diol having a hydroxyalkyl group bonded to an aromatic ring and optionally having a substituent.

6. A polyester compound according to claim 1, wherein $n^{Dc}$ is 0, and $X^{Dc}$ is a phenylene group optionally having a substituent.

7. A polyester compound according to claim 1, wherein
i) n is 0, X is an alkylene group having 1 to 10 carbon atoms and optionally having a substituent or a cycloalkylene group having 3 to 10 carbon atoms and optionally having a substituent, or
ii) n is 1 or 2, X is an alkylene group having 1 to 6 carbon atoms and optionally having a substituent, Y is an imino group optionally having a substituent, an oxyalkylene group having 1 to 6 carbon atoms and optionally having a substituent, or a phenylene group optionally having a substituent, and Z is an alkylene group having 1 to 3 carbon atoms and optionally having a substituent, or a single bond.

8. A polyester compound according to claim 1, wherein said substituent is selected from the group consisting of a halogen atom, an alkyl group, an aryl group, a hydroxy group, an amino group, and a mercapto group.

9. A polyester compound according to claim 1, wherein said compound represented by formula (2) is one or more compounds selected from the group consisting of compounds of formula (2-1) to formula (2-26):

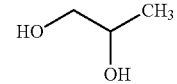 (2-1)

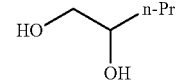 (2-2)

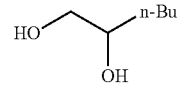 (2-3)

-continued

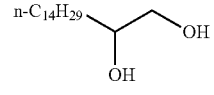 (2-4)

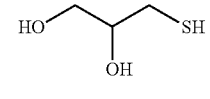 (2-5)

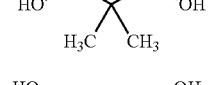 (2-6)

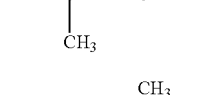 (2-7)

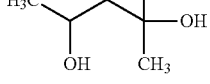 (2-8)

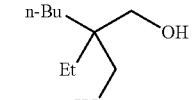 (2-9)

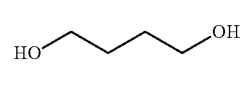 (2-10)

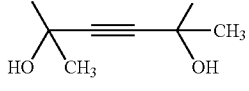 (2-11)

 (2-12)

 (2-13)

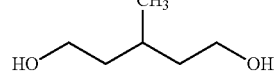 (2-14)

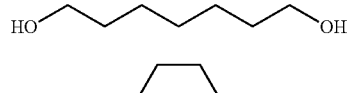 (2-15)

 (2-16)

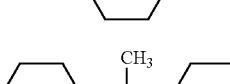 (2-17)

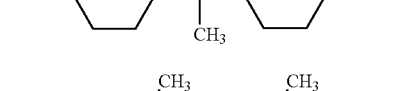 (2-18)

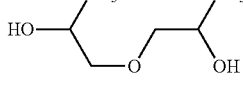 (2-19)

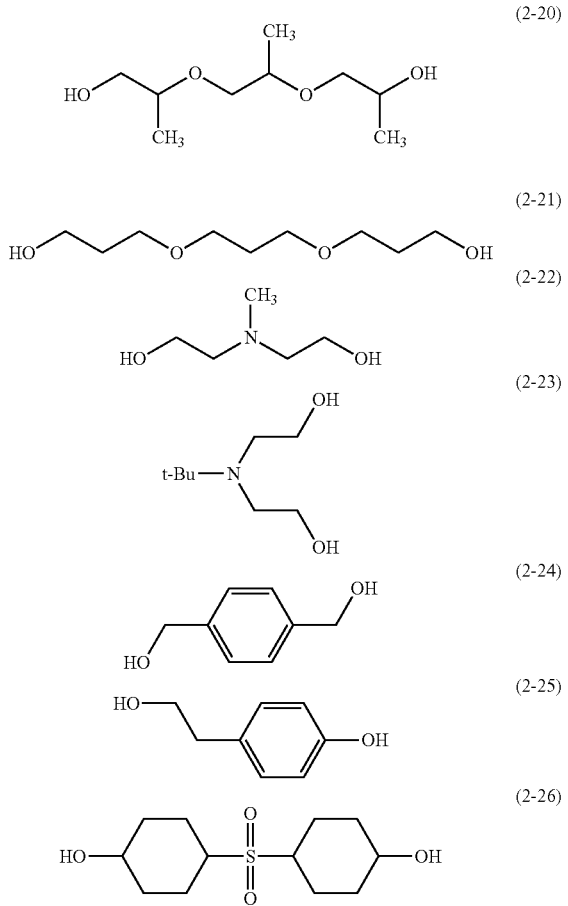

wherein Et represents an ethyl group, n-Pr represents an n-propyl group, n-Bu represents an n-butyl group, and t-Bu represents a tert-butyl group.

10. A polyester compound according to claim 9, wherein said compound represented by formula (2) is a compound represented by formula (2-1), formula (2-10), formula (2-13), formula (2-16), formula (2-17), formula (2-19), formula (2-20), formula (2-22), formula (2-24), or formula (2-25).

11. A polyester compound according to claim 1, wherein said polyester compound is produced by reacting said compound represented by formula (1), said compound represented by formula (2), and one or more compounds selected from the group consisting of an aromatic dicarboxylic acid, a salt thereof, an ester thereof, and a halide thereof.

12. A polyester compound according to claim 1, wherein said polyester compound is produced by reacting said compound represented by formula (1) and said compound represented by formula (2) in a molar ratio, (compound represented by formula (1))/(compound represented by Formula (2)), of 10/1 to 1/10.

13. A polyester compound according to claim 1, which is produced by reacting said compound represented by formula (1) and said compound represented by formula (2) at a temperature of −10 to 200° C.

14. A polyester compound, containing one or more structural units selected from the group consisting of formulae (i) to (iv):

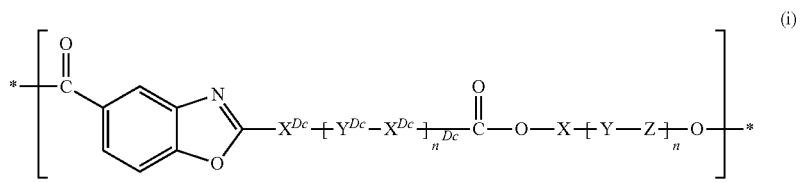

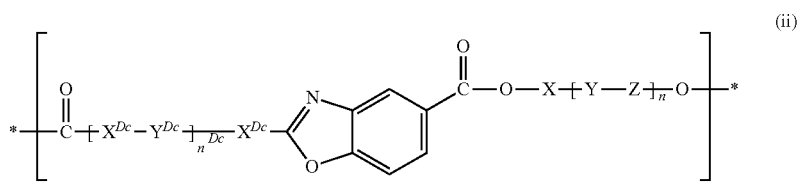

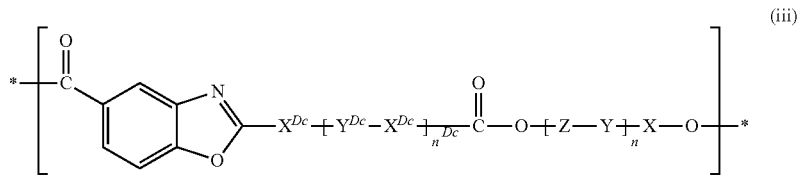

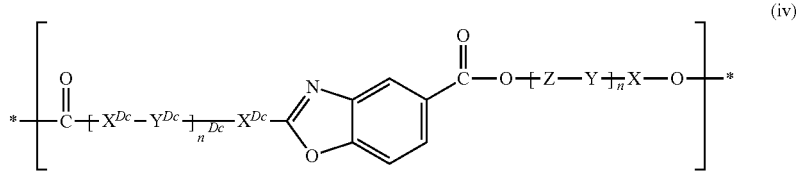

wherein
- $X^{Dc}$ is a divalent aromatic group optionally having a substituent;
- $Y^{Dc}$ is —O—, —N=N—, a carbonyl group, an alkenylene group optionally having a substituent, or a single bond;
- $n^{Dc}$ is an integer of 0 to 2;
- X is a divalent aliphatic hydrocarbon group optionally having a substituent;
- Y is an imino group optionally having a substituent, a divalent aromatic group optionally having a substituent, an oxyalkylene group optionally having a substituent, a group —S(=O)$_2$—, or an alkylene group optionally having a substituent;
- Z is a divalent aliphatic hydrocarbon group optionally having a substituent or a single bond;
- n is an integer of 0 to 5;
- \* is a bond;
- when there are a plurality of $X^{Dc}$, they may be the same as or different from each other;
- when there are a plurality of $Y^{Dc}$, they may be the same as or different from each other;
- when there are a plurality of Y, they may be the same as or different from each other; and
- when there are a plurality of Z, they may be the same as or different from each other.

15. A polyester compound according to claim 14, which has an intermediate glass transition point ($T_{mg}$) of 80° C. or higher and 300° C. or lower.

16. A polyester compound according to claim 14, which has a melting point ($T_m$) of 140° C. or higher and 500° C. or lower.

17. A polyester compound according to claim 14, which has a 5% mass reduction temperature ($T_d$) of 250° C. or higher and 500° C. or lower.

18. A method of producing a polyester compound, comprising reacting:

(1) a compound represented by formula (1):

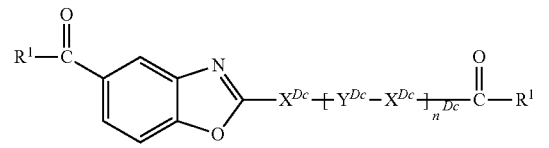

wherein
- $R^1$ is a hydroxy group, a halogen atom, an alkoxy group, a cycloalkyloxy group, an aryloxy group, a group —OM, or a group —O—Si(R$^2$)$_3$, where M is a metal atom and $R^2$ is an alkyl group;
- $X^{Dc}$ is a divalent aromatic group optionally having a substituent;
- $Y^{Dc}$ is —O—, —N=N—, a carbonyl group, an alkenylene group optionally having a substituent, or a single bond;
- $n^{Dc}$ is an integer of 0 to 2;
- the two $R^1$ may be the same as or different from each other;
- when there are a plurality of $X^{Dc}$, they may be the same as or different from each other; and
- when there are a plurality of $Y^{Dc}$, they may be the same as or different from each other, with (2) a compound represented by formula (2):

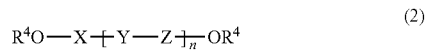

wherein
- $R^4$ is a hydrogen atom, an acyl group, or a group —Si(R$^5$)$_3$, where $R^5$ is an alkyl group;
- X is a divalent aliphatic hydrocarbon group optionally having a substituent;
- Y is an imino group optionally having a substituent, a divalent aromatic group optionally having a substituent, an oxyalkylene group optionally having a substituent, a group —S(=O)$_2$—, or an alkylene group optionally having a substituent;
- Z is a divalent aliphatic hydrocarbon group optionally having a substituent or a single bond;
- n is an integer of 0 to 5;
- the two $R^4$ may be the same as or different from each other;
- when there are a plurality of Y, they may be the same as or different from each other; and
- when there are a plurality of Z, they may be the same as or different from each other, at a molar ratio, (compound represented by formula (1))/(compound represented by formula (2)), of 10/1 to 1/10.

\* \* \* \* \*